United States Patent [19]
Saito et al.

[11] Patent Number: 6,112,726
[45] Date of Patent: Sep. 5, 2000

[54] FUEL SUPPLY SYSTEM FOR INJECTED ENGINE

[75] Inventors: Chitoshi Saito; Masahiko Kato; Masafumi Sougawa, all of Hamamatsu, Japan

[73] Assignee: Sanshin Kogyo Kabushiki Kaisha, Hamamatsu, Japan

[21] Appl. No.: 09/145,912

[22] Filed: Sep. 2, 1998

[30] Foreign Application Priority Data

| Sep. 3, 1997 | [JP] | Japan | 9-238118 |
| Sep. 3, 1997 | [JP] | Japan | 9-238508 |
| Sep. 3, 1997 | [JP] | Japan | 9-238509 |

[51] Int. Cl.$^7$ ............................................. F02M 37/04
[52] U.S. Cl. ................... 123/509; 123/195 P; 440/900
[58] Field of Search ............................ 123/508, 509, 123/195 P, 195 R, 198 C, 196 W; 417/319, 362

[56] References Cited

U.S. PATENT DOCUMENTS

| 1,963,658 | 6/1934 | Ford | 123/509 |
| 4,532,893 | 8/1985 | Day et al. | 123/509 |
| 5,617,821 | 4/1997 | Tsunoda et al. | 123/195 P |
| 5,640,936 | 6/1997 | Hudson | 123/196 W |
| 5,682,845 | 11/1997 | Woody | 123/73 A |
| 5,685,273 | 11/1997 | Johnson et al. | 123/467 |
| 5,701,872 | 12/1997 | Kaku et al. | 123/495 |
| 5,755,193 | 5/1998 | Mishima | 123/195 P |
| 5,890,472 | 4/1999 | Saito | 123/509 |

FOREIGN PATENT DOCUMENTS

| 29533 | 4/1933 | Netherlands | 123/508 |

*Primary Examiner*—Thomas N. Moulis
*Attorney, Agent, or Firm*—Knobbe, Martens, Olson & Bear LLP

[57] ABSTRACT

A number of embodiments of outboard motors employing direct fuel injection systems having high pressure fuel pumps that are mechanically driven off of the engine crankshaft. A wide variety of driving arrangements are disclosed which include direct and indirect drives and drive that employs flexible transmitters and other types of driving arrangements. Furthermore, the pump operating mechanisms are also provided with lubricating systems that will permit servicing of the lubricant even though the drive arrangement may be positioned outside of the crankcase of the engine. Furthermore, arrangements for mounting various components including the fuel pump and other engine-driven accessories in an outboard motor are shown.

20 Claims, 22 Drawing Sheets

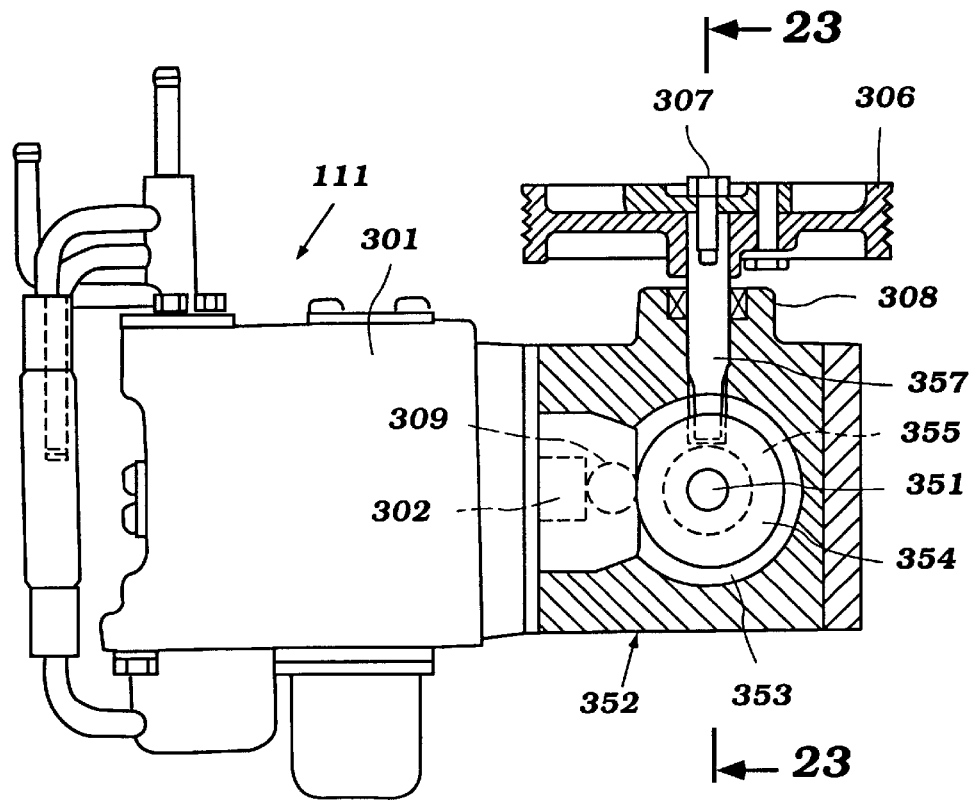
*Figure 22*
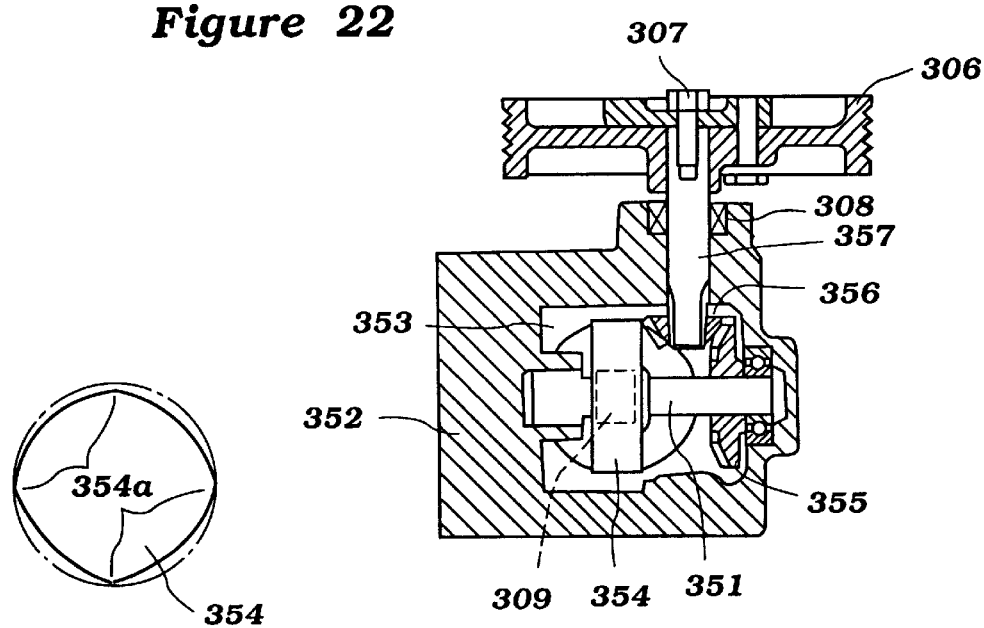
*Figure 24*                *Figure 23*

FUEL SUPPLY SYSTEM FOR INJECTED ENGINE

BACKGROUND OF THE INVENTION

This invention deals with a fuel supply system for a direct injected engine and more particularly to an improved high pressure fuel supply system for a direct injected outboard motor.

The charge forming system for internal combustion engines in many applications are becoming more sophisticated in the interest of obtaining better engine performance, both in terms of power output and also in terms of fuel economy and exhaust emission control. The charge formers used have progressed from carburetors to manifold injection and now direct cylinder injection is being strongly considered.

By injecting the fuel directly into the combustion chamber rather than mixing it with the inducted air in the induction system, it is possible to achieve a condition which is referred to as "stratification." It is generally acknowledged that is necessary to have a stoichiometric mixture in order to initiate combustion. However, if the entire cylinder is charged with a stoichiometric mixture, the overall mixture is richer than required for most running conditions.

With stratification, there is provided a stoichiometric fuel air mixture that is intended to be present at the gap of the spark plug at the time it is fired so as to initiate combustion. The remainder of the cylinder surrounding this stoichiometric patch can be leaner than stoichiometric or can, in fact, comprise pure air. In order to achieve this stratification, direct cylinder injection may be necessary. Even without stratification, however, direct cylinder injection has numerous advantages.

In certain engine applications, the utilization of direct cylinder injection presents some design difficulties. The application of fuel injection and direct cylinder injection to outboard motors is an example of such problem areas and applications. This is primarily due to the compact nature of an outboard motor.

With a direct cylinder injection system and in connection with outboard motors because of their compact nature, it is generally required to have a low pressure fuel pump, a high pressure fuel pump and a vapor separator for ensuring that vapor is not delivered to the fuel injectors. The vapor separator is particularly necessary with outboard motor application because of the small space in which the engine is confined and the fact that the engine is generally surrounded by a closely fitting protective cowling. Fuel vapor problems are thus particularly prevalent with outboard motor applications.

With injection systems for outboard motors, it has been the practice to position the high pressure pump directly in the vapor separator. This can save space but does necessitate generally the use of an electrically operated fuel pump. Electric fuel pumps, however, do not generate sufficient pressure for direct cylinder injection in most instances. Thus, in order to enjoy the full benefits of direct cylinder fuel injection, it is necessary to use a higher pressure pump. Normally, positive displacement pumps are employed for this purpose.

When a positive displacement pump is employed, it must be driven off of the engine if sufficiently high pressures as required for direct cylinder injection are to be obtained. This presents problems in layout and positioning of the fuel pump in outboard motors.

This problem is particularly aggravated by the fact that in an outboard motor the engine is mounted so that its output or crankshaft rotates about a vertically extending axis. As is well known, most engine applications position the engine so that the output shaft rotates about a horizontally extending axis.

With outboard motors, on the other hand, the vertical positioning of the engine output shaft is desirable to facilitate and simplify the connection to the driveshaft which drives a propulsion device in the lower unit of the outboard motor. This gives rise to problems and where the high pressure fuel pump is located and how it is driven.

Another problem in connection with outboard motors is that the total sales volume is quite small compared to applications such as automotive applications. Thus, the outboard motor industry has been somewhat slow to make changes following the automotive industry due to the tremendous tooling expenses involved and the fact that long production runs are required to recoup tooling change costs.

Therefore, there is some advantage if automotive components such as high pressure fuel pumps for direct injection system can be employed with outboard motors. However, the vertical positioning of the engine crankshaft means that the automotive fuel pumps cannot be operated in their normal manner as applied to motor vehicles.

That is, in a motor vehicle, the crankshaft rotates about a horizontally extending axis and the plungers of the high pressure pump also reciprocate along horizontal axes. It is not always possible to mount the pump in the outboard motor so that its plungers will reciprocate about a vertical axis. In addition, if the pump is reoriented, certain other problems may arise. For example, reorientation may affect the operation of check valves, particularly if they are gravity biased. Also air purging of the pump can be adversely affected.

It is, therefore, a principal object of this invention to provide an improved drive arrangement wherein plunger type pumps may be driven from the crankshaft of a vertically disposed application for utilization in outboard motors.

It is a further object of this invention to provide an improved drive mechanism for driving a plunger type pump from the vertical output shaft of an outboard motor engine.

Belt drives for driving accessories are quite popular in outboard motors as well as in other applications. Belt drives offer the advantages of quiet operation and also the drive belt can be positioned externally of the engine and thus, air cooled. This also permits the use of a more compact assembly.

However, a belt drive is only practical, in most applications, for transmitting motion between parallel axis shafts. If a plunger type pump is to be employed, therefore, a transmission must be incorporated for transferring the drive from a vertical shaft to a horizontal shaft in most types of applications. This involves the use of a transmission that contains gearing.

If the transmission is positioned externally of the engine, as may be desirable in many instances, then it is necessary to provide an arrangement wherein the transmission will be lubricated. This also necessitates constructing the transmission in such a way that its lubricant can be serviced.

It is, therefore, a still further object of this invention to provide an improved pump drive mechanism that incorporates a transmission which transmission includes gearing and arrangement for servicing the gearing.

It is a further object of this invention to provide a reciprocating pump driving transmission for use in outboard motors.

In some instances it may be desirable to actually circulate lubricant through the drive mechanism for the pump or through the pump drive. Where this is remotely positioned from the engine crankcase this is difficult.

It, therefore, is a further object of this invention to provide an improved lubricating system for the drive arrangement for a high pressure fuel injection pump.

It is a yet further object of this invention to provide an improved lubricating system for a drive arrangement for a high pressure fuel injection pump that is positioned remotely from the crankcase of the engine that it serves.

SUMMARY OF THE INVENTION

Certain of the features of this invention are adapted to be embodied in an outboard motor that is comprised of a power head consisting of an internal combustion engine and a surrounding protective cowling. A driveshaft housing and lower unit containing a propulsion device within its lower unit depends from the power head. The engine is mounted within the protective cowling so that its crankshaft rotates about a vertically extending axis. The crankshaft is coupled to a driveshaft that depends into the driveshaft housing and lower unit for driving the propulsion device. The engine is formed with at least one combustion chamber and a fuel injector is provided for injecting fuel directly into the combustion chamber. A high pressure fuel pump is contained within the protective cowling and has a pumping element that reciprocates along a horizontal axis for pressurizing fuel for delivery to the fuel injector.

In accordance with a first feature of the invention as embodied in an outboard motor as described above, a mechanical transmission is provided for driving the pumping element from the crankshaft.

Another feature of the invention also adapted to be embodied in an outboard motor as set forth above. In connection with this other feature, the mechanical transmission includes a gear casing having an internal cavity containing a pair of inner meshing gears. The gear casing is provided with means for permitting lubricant in the gear casing to be serviced.

Another feature of this invention is adapted to be embodied in a system for lubricating the high pressure fuel injection pump of a two cycle, crankcase compression internal combustion engine. The engine includes a cylinder block, cylinder head, crankcase assembly that defines at one side a combustion chamber in which combustion occurs and at the other side, a crankcase chamber in which a crankshaft driven by the combustion is journalled. A high pressure fuel injection pump having a mechanical drive is positioned remotely from the crankcase chamber for delivering high pressure fuel to a fuel injector for the engine. A system is provided for supplying lubricant to the crankcase chamber for lubricating components of the engine. A lower portion of the crankcase chamber is formed with a oil receiving well in which drained oil can accumulate. A conduit including a one-way check valve connects this well with the drive mechanism for the high pressure fuel injection pump so that when the high pressure exists in the crankcase, the lubricant collected will be delivered to the pump drive for lubricating it.

BRIEF DESCRIPTION OF THE DRAWINGS

FIG. 22 is a view, in part similar to FIGS. 19 and 21, but shows yet another embodiment of the invention. (Tenth Embodiment)

FIG. 23 is a cross-sectional view of the transmission for this embodiment and is taken along the line 23–23 of FIG. 22. (Tenth Embodiment)

FIG. 24 is an enlarged elevational view showing the driving cam for the pumping plunger in this embodiment. (Tenth Embodiment)

DETAILED DESCRIPTION OF THE PREFERRED EMBODIMENTS

Embodiment of FIGS. 1–6

Figure 2:
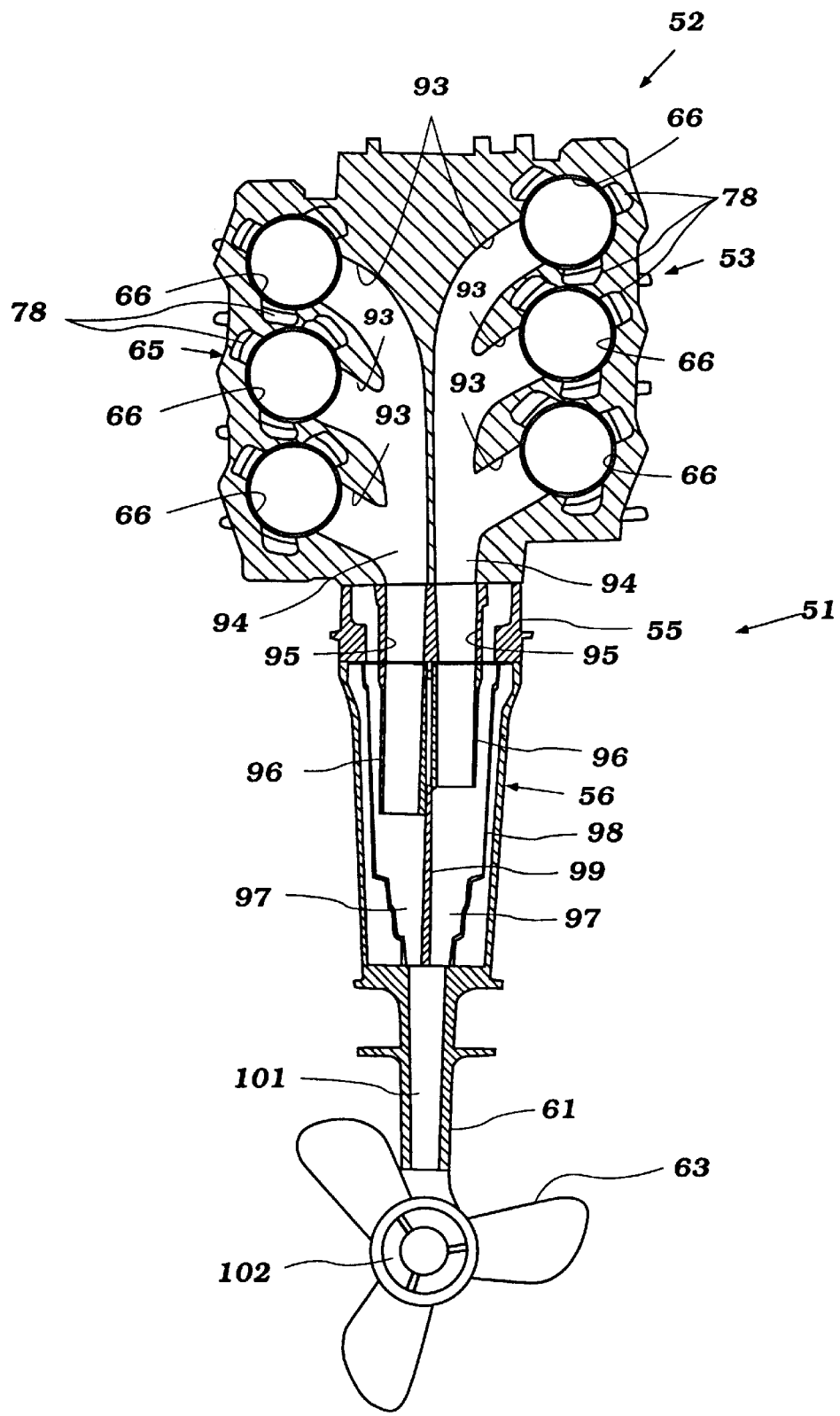
FIG. 2 is a rear elevational view of the complete outboard motor with portions broken away and shown in section and also with the protective cowling of the power head removed. (First Embodiment)
Figure 3:
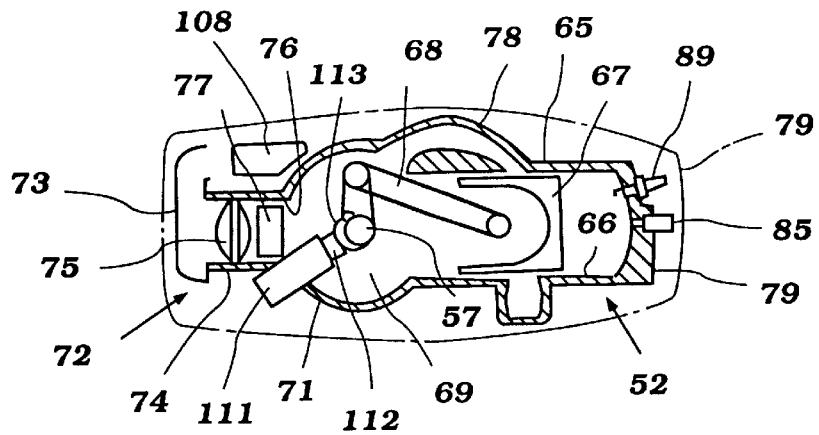
FIG. 3 is a side elevational view of the outboard motor showing certain components thereof in schematic fashion and some components in cross section. (First Embodiment)

Referring now in detail to the first embodiment and initially primarily to FIGS. 2 and 3, an outboard motor constructed in accordance with this embodiment is identified generally by the reference numeral 51. Although the invention is described in conjunction with an outboard motor such as the outboard motor 51, it will be readily apparent to those skilled in the art that certain features of the invention may be embodied in other engine application but particularly those where the engine is operated so that its crankshaft rotates about a vertically extending axis. Since this is normally environment in an outboard motor, the outboard motor 51 is shown as a typical embodiment in which the invention is utilized. Since the invention deals primarily with the engine, indicated generally by the reference numeral 52, and specifically the fuel supply system therefore, the details of the outboard motor 51 per se will be described only generally.

The outboard motor 51 includes a power head, indicated generally by the reference numeral 53 which includes the engine 52 and a surrounding protective cowling shown schematically in these figures and indicated by the reference numeral 54. As is typical and as will be illustrated in some further embodiments, the protective cowling 54 is comprised of a lower tray portion and a detachable upper main cowling portion. This construction may be of any known type.

The engine 52 is supported on an exhaust guide plate 55 that is positioned at the upper end of a driveshaft housing and lower unit assembly, indicated generally by the reference numeral 56. As may be seen in FIG. 3, the engine 52 is supported on the guide plate 55 so that its crankshaft 57 rotates about a vertically disposed axis. This is to facilitate a splined connection, shown schematically at 58 to the upper end of a driveshaft 59. The driveshaft 59 depends into and is rotatably journaled within the driveshaft housing and lower unit 56.

A lower unit assembly 61 is provided at the lower end of the driveshaft housing and lower unit assembly 56 and journals a propeller shaft 62 to which a propulsion device such as a propeller 63 is affixed for rotation. The propeller 63 is driven in selected forward and reversed direction by a reversing type, bevel gear transmission, indicated generally by the reference numeral 64 and which has a construction as is well known in this art. As noted before, the general construction of the outboard motor 51 may be of any known type with which the invention can be practiced.

Referring now additionally to the remaining figures, the construction of the engine 52 will be described more fully. The engines 52 is in this and all other main embodiments that will be described, a V-6 type engine operating on a two stroke crankcase compression principle. Although such an engine construction is illustrated in most figures, it will be apparent to those skilled in the art how the invention can be practiced with engines having other cylinder members and other cylinder configurations.

Figure 4:
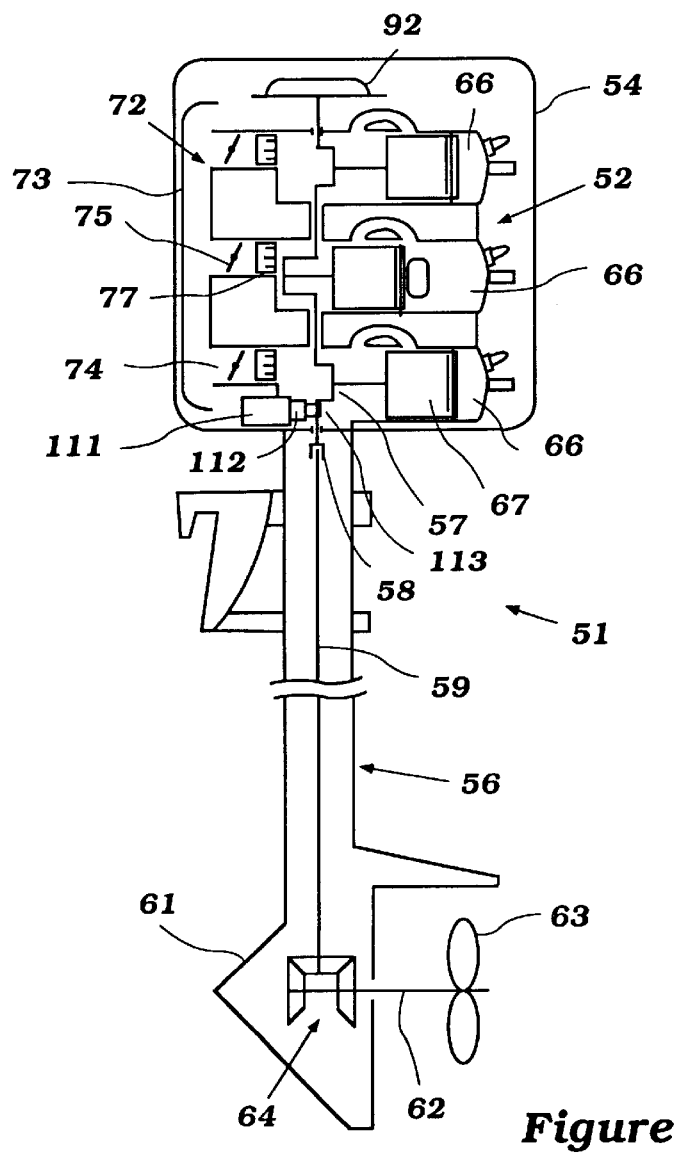
FIG. 4 is a top plan view of the power head as shown in FIG. 3, but shows an inline type of engine arrangement to schematically illustrate how the high pressure pump is driven in this embodiment. (First Embodiment)

In fact, some figures such as FIG. 4 show only inline portions or one bank of the two banks of a V-6 engine. In other figures, only a single cylinder may be depicted for ease of understanding. Those skilled in the art will readily understand how the invention can be practiced in conjunction with engines of other cylinder numbers, other cylinder configurations and in fact engines other than two-cycle engines although some features of the invention have particular utility with two cycle engines. This will be apparent to those skilled in the art.

The engine 52 is comprised of a cylinder block, indicated generally by the reference numeral 65 and which has a pair of angularly inclined cylinder banks. Three cylinder bores 66 are formed in each of these cylinder banks. Pistons 67 reciprocate in each cylinder bore 66.

The pistons 67 are connected by piston pins to the upper or small ends of connecting rods 68 in a manner that is well known in this art. The big ends of the connecting rods 67 are journaled on the crankshaft 57. The crankshaft 57 is rotatably journaled within a crankcase chamber 69 formed by the skirt of the cylinder block 65 and a crankcase member 71 that is affixed thereto in a known manner.

As is well known in two-cycle engine practice, the portions of the crankcase chamber 69 associated with each of the cylinder bores 66 are sealed relative to each other in a suitable manner. An air induction system, shown best in FIGS. 3, 4 and 6 and indicated generally by the reference numeral 72, is provided for delivering an air charge to these crankcase chambers sections when the pistons 67 are moving upwardly in their respective cylinder bores 66.

This air induction system includes an inlet device or a silencer mechanism 73 that includes a plenum chamber and which draws atmospheric air from within the protective cowling 54. Air is emitted to the interior of the protective cowling 54 from the atmosphere through a suitable air inlet arrangement. This air inlet arrangement preferably includes an arrangement for separating water from the inducted air. A specific example is shown in phantom in FIG. 11 and will be described in connection with that embodiment.

The air inlet device 73 delivers the collected air to individual throttle bodies 74 in which flow controlling throttle valves 75 are provided. These throttle valves 75 are operated by a linkage system in unison and control the speed of the engine 52 in a well known manner.

The throttle bodies each 74 communicate with respective intake ports 76 formed in the crankcase member 71 for communicating the intake charge to a respective one of the sections of the crankcase chamber 69. Reed-type check valves 77 are provided in the intake ports 76 so as to permit the inducted air to flow into the sections of the crankcase chamber 69 when the pistons 67 are moving upwardly in the cylinder bores 66. When the pistons move downwardly in the cylinder bore 66, the reed-type check valve 77 will close so as to permit the air charge to be compressed in the sections of the crankcase chamber 69.

The compressed charge is then transferred through scavenge passages 78 to combustion chambers that are formed by the heads of the pistons 67, the cylinder bores 66 and a cylinder head assembly, indicated generally by the reference numeral 79, associated with each cylinder bank. The cylinder head assemblies 79 are affixed to the banks of the cylinder block 65 by means of threaded fasteners 81 (FIG. 5).

Each cylinder head assembly 79 includes a main head member 82 that has a recess 83 that faces the head of the piston 67 and which defines the major portion of the combustion chamber when the piston 67 is at its top dead center position. The cylinder head assembly 79 also includes a further cylinder head member 84 that is fixed to the main cylinder head member 82 by the threaded fasteners 81.

High pressure fuel injectors 85 are mounted in the cylinder head assemblies 79, one for each cylinder bore 66. These fuel injectors 85 are supplied with fuel from a fuel supply system, which will be described in more detail later and inject the fuel from a discharge nozzle that is controlled by an injector valve. The type of injector employed may be of any type known in the art and has an electrical solenoid (not shown) that operates the injector valve to control the spray of fuel into the cylinder bores 66.

Figure 5:
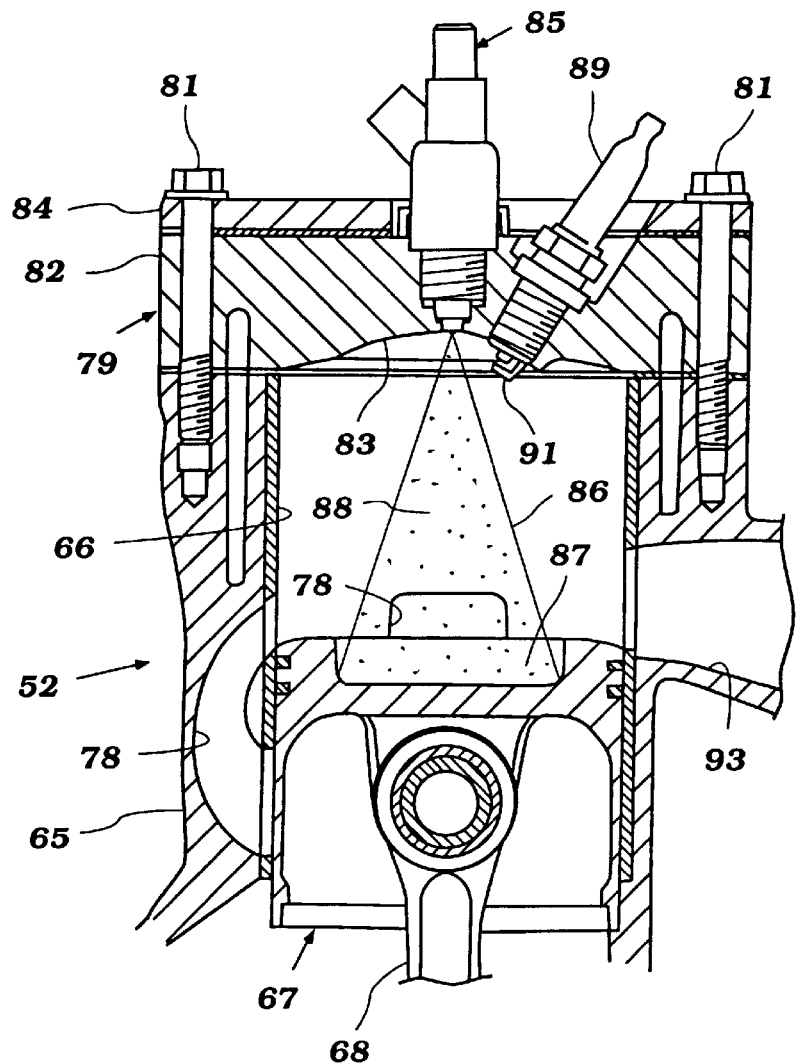
FIG. 5 is an enlarged cross-sectional view taken through one of the cylinders of the engine showing the relationship of the fuel injector and spark plug. (First Embodiment)

As best seen in FIG. 5, the injection spray pattern from the injector 85 is generally conical as indicated at 86 and is directed toward a bowl 87 formed in the head of the piston 66. In the illustrated embodiment, this bowl 87 is symmetric about the cylinder bore axis 88. Any suitable injection control strategy may be employed in conjunction with the invention.

Spark plugs 89 are mounted in the cylinder head assembly 79 and have their spark gaps 91 disposed in the cylinder head recesses 83. This spark gap 91 is in proximity to the bowl 87 of the piston when the piston reaches its top dead center position so as to ensure the presence of a stoichiometric mixture at the time when the spark plugs 89 are fired. Again, any control strategy may be employed for firing the spark plugs.

Figure 1:
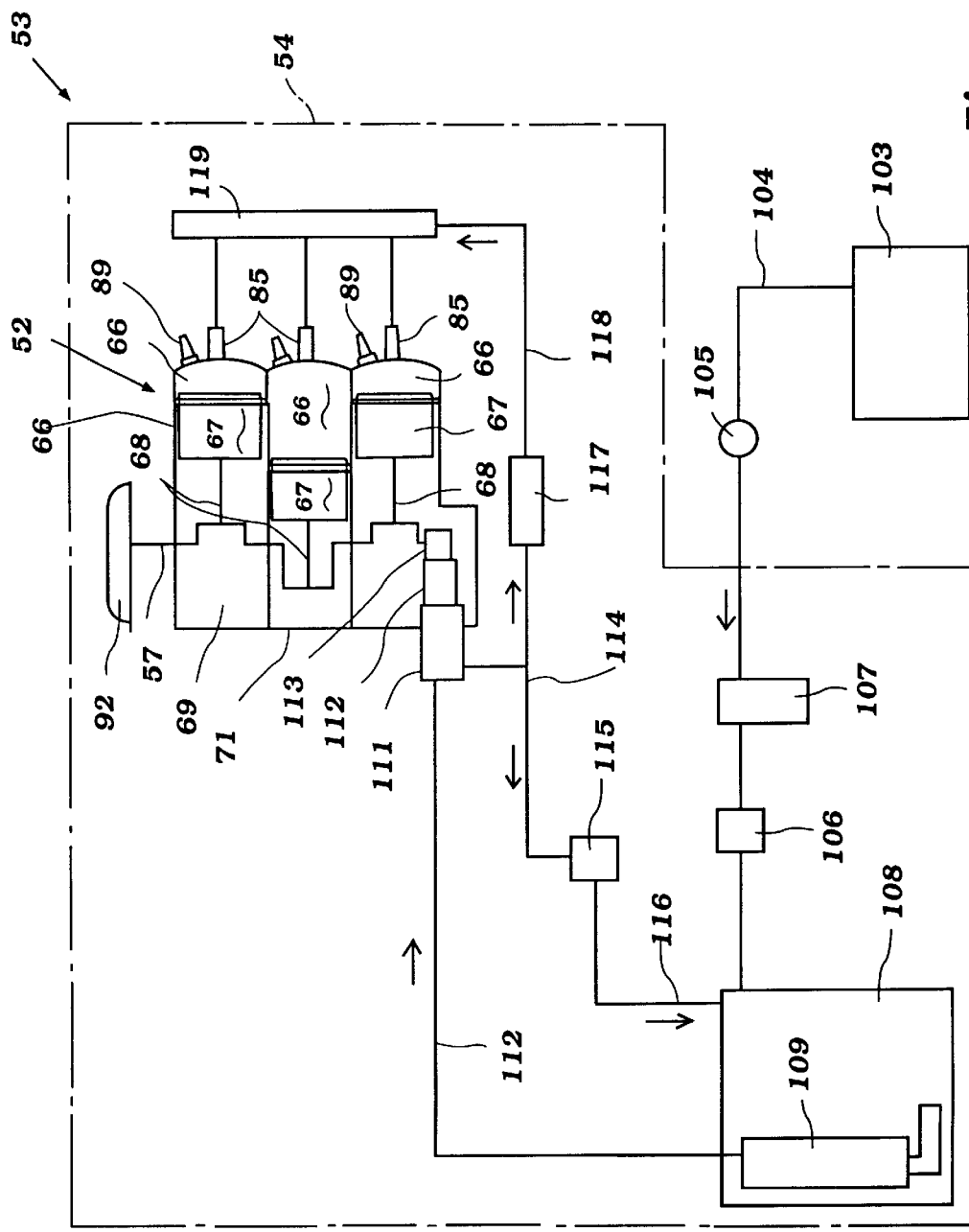
FIG. 1 is a partially cross-sectional view of the power head of an outboard motor constructed in accordance with a first embodiment of the invention and showing some of the components schematically. (First Embodiment)

The spark plugs 89 are fired with electrical energy derived from a flywheel magneto, which is shown schematically at 92 and which is driven off the upper end of the crankshaft 57 as seen in FIGS. 1 and 3. Once the charge is ignited by the spark plugs 89 that will burn and expand so as to drive the pistons 67 downwardly within the cylinder bores 66. This motion is transmitted through the connecting rods 68 to drive the crankshaft 57 in a manner well known in the art.

Eventually, the downward movement of the pistons 67 will uncover exhaust ports 93 that are formed in the cylinder block 65 in the area of the valley between the cylinder banks as best seen in FIG. 2. These exhaust ports 93 communicate with respective exhaust manifold sections 94 formed in the respective cylinder bank and which collect the exhaust gases and deliver them downwardly toward the exhaust guide 55.

The exhaust guide 55 has a pair of exhaust passages 95, each of which communicates with an outlet end of the respective manifold 94. Exhaust pipes 96 are fixed to the underside of the exhaust guide plates 55 and deliver the exhaust gases to a pair of expansion chambers 97 formed in the driveshaft housing and lower units by an expansion chamber forming member 98 and a dividing baffle 99.

The exhaust gases can then pass downwardly from these expansion chambers 97 to an underwater exhaust gas discharge, including a collector member 101 in the lower unit 61. This collector unit 101 communicates with a through the hub exhaust 102 for underwater exhaust gas discharge under most running conditions.

As is typical with outboard motor practice, there may also be provided an above the water exhaust gas discharge through which the exhaust gases exit the outboard motor 51 when operating at idle or low speed. The through the hub exhaust gas discharge path 102 is relatively deeply submerged under this condition. In addition, the exhaust gas pressure is low and hence these above the water idle discharge paths are well known in this art. Any known type may be used in the practicing of the invention.

Generally, the construction of the outboard motor 51 and the engine 52 as thus far described may be considered to be conventional. As should be apparent from the foregoing description, the invention deals primarily with the fuel supply system for supplying the fuel injectors 85 with high pressure fuel. This fuel supply system will now be described in detail by initial reference primarily to FIG. 1.

The fuel system includes a main fuel tank 103 which is positioned, in accordance with normal outboard motor practice, in the hull of the watercraft with which the outboard motor 51 is associated. A specific showing of such an arrangement appears in FIG. 9 and will be described in more detail later by reference to that Figure. A fuel line 104 in which a manual priming pump 105 connects with remote fuel tank 103 to the power head 53 through a quick disconnect coupling.

Within the power head 53, there is provided a first low pressure pump 106 which draws the fuel through the lines 104 and through a fuel filter 107. The low pressure pump 106 may be, for example, the type of pump which is operated by pressure variations within a section of the crankcase chamber 69.

This fuel is delivered to a vapor separator 108 which is located within the power head in certain locations such as on one side of the air induction system as seen in FIG. 4. This vapor separator 108 has a float operated valve that maintains a predetermined level of fuel within it. In addition, a vent line vents the vapors off to a suitable location, for example, to the air inlet device 73.

An electric pump 109 is submerged in the fuel vapor separator 108 and delivers fuel at an elevated pressure to a plunger type, automotive high pressure pump, indicated generally by the reference numeral 111 through a supply line 112.

In this embodiment, the high pressure pump 111 has one or more plungers that reciprocate along a horizontal axis. As best seen in FIGS. 3 and 4, these plunger has a tappet portion 112 that is engaged with an eccentric cam 113 that is formed on the crankshaft 57 at its lower end. Thus, as the crankshaft 57 rotates, the lobe of the cam 113 will alternately press on the tappet 112 and operate the associated plunger so as to create high pressure amplification of the fuel pressure to a delivery line 114.

In this delivery line 114, there is provided a pressure regulating valve 115 that regulates the pressure of the fuel which will be delivered to the fuel injectors 85. This is done by dumping excess fuel back to the vapor separator 108 through a return line 116. The remaining, regulated fuel passes through a filter 117 and supply conduits 118 to a pair of fuel rails 119. Each fuel rail 119 is associated with a respective one of the cylinder banks and the fuel injectors 85 associated therewith for supply of high pressure fuel thereto in a known manner.

Figure 6:
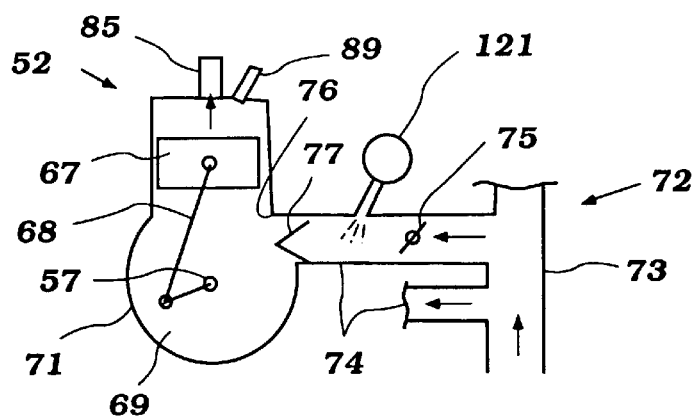
FIG. 6 is a partially schematic, cross-sectional view showing in more detail the induction system for the engine and the lubricating system associated therewith. (First Embodiment)

The engine 52 is also provided with a lubricating system which is shown only schematically in FIG. 6, but which is important in connection with the drive for the high pressure pump 111. This lubrication system is indicated schematically at 121 and includes a lubricant storage tank and pump that delivers fuel through a conduit to lubricating ports 122 in the intake manifold runners or throttle bodies 74. This fuel then is mixed with the intake air and delivered to the sections of the crankcase chamber 69. This construction is shown in more detail in FIG. 8 and will be described shortly in connection with the description of the embodiment of FIGS. 7 and 8

As a result of this lubrication and since the drive cam 113 and tappet 112 are positioned in the crankcase chamber 69 and specifically at the section at the lower end thereof, they will be lubricated by this lubricant.

Figure 7:
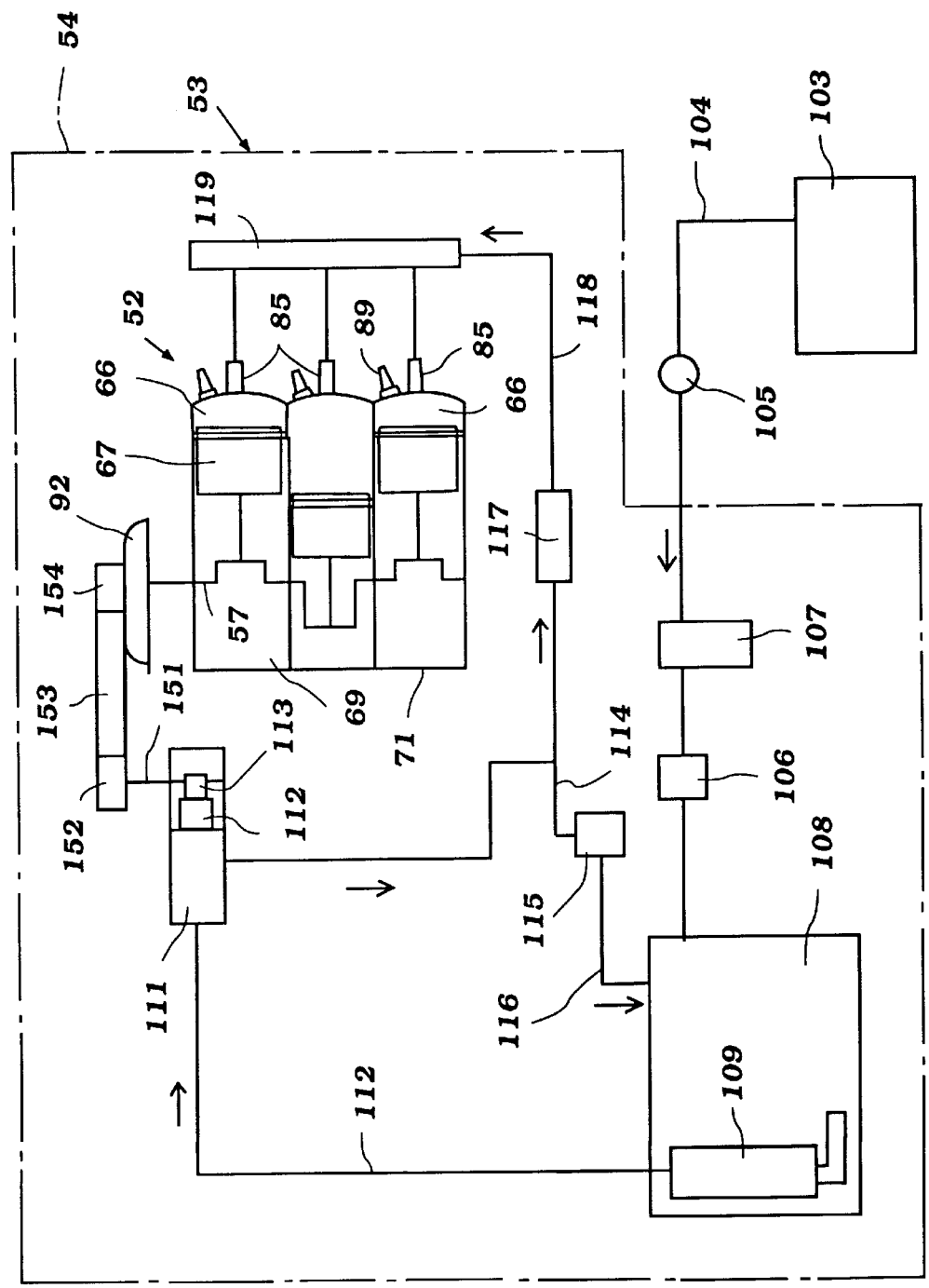
FIG. 7 is a view, in part similar to FIG. 1, and shows another embodiment of the invention. (Second Embodiment)
Figure 8:
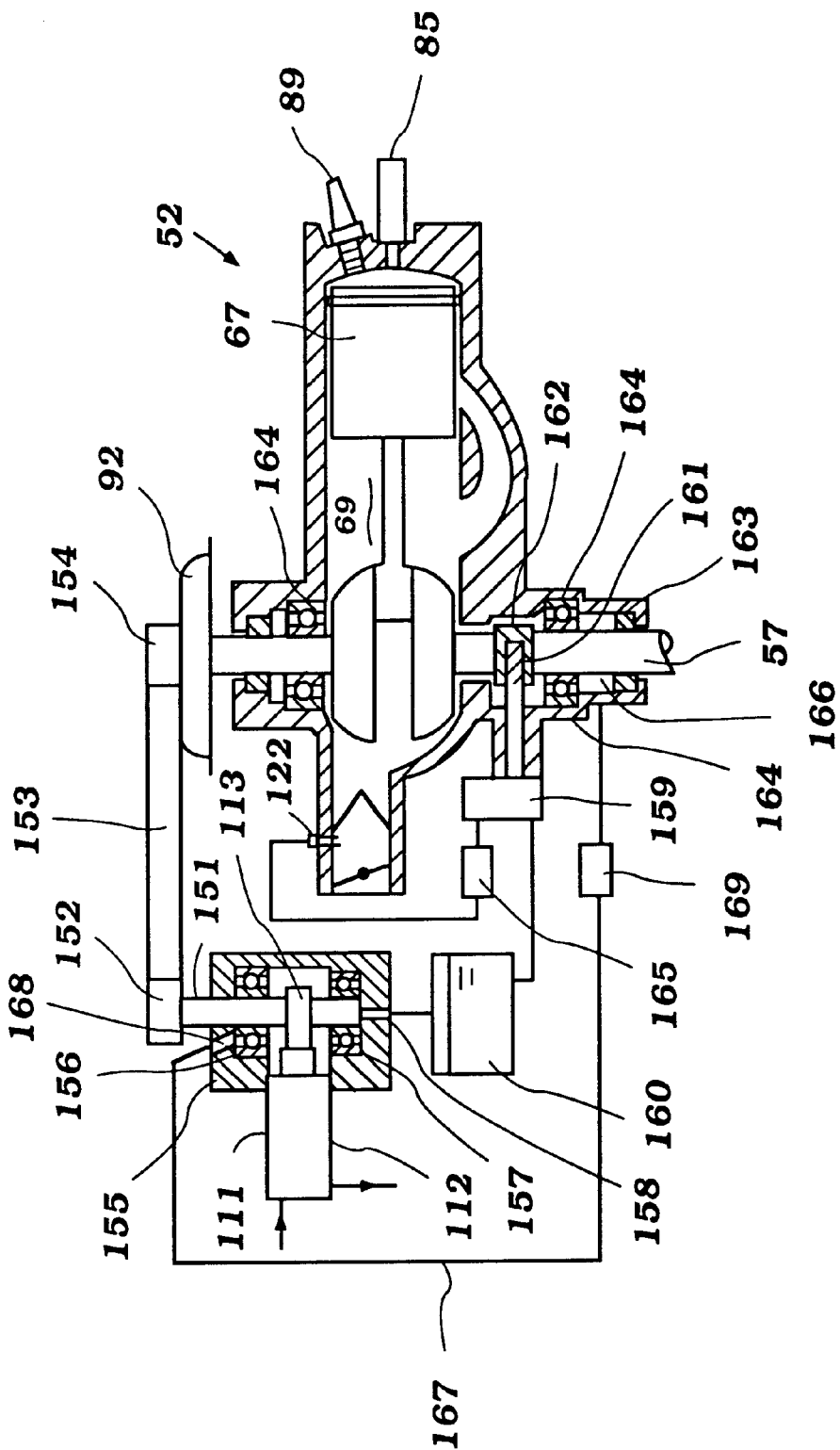
FIG. 8 is a more detailed cross-sectional view looking in the same direction as FIG. 7 but only showing a single cylinder to more clearly illustrate how the transmission for the high pressure pump and other components are lubricated in this embodiment. (Second Embodiment)

Embodiment of FIGS. 7 and 8

FIGS. 7 and 8 illustrate another embodiment which is generally similar to the embodiment of FIGS. 1–6. For that reason, only two figures are necessary to understand the construction and operation of this embodiment, and these two figures correspond to FIGS. 1 and 4, respectively, although FIG. 8 is a view looking in a direction perpendicular to that of FIG. 7. Where the components of this embodiment are the same as that previously described, they have been indicated by the same reference numerals and will be described again only insofar as is necessary to understand the construction and operation of this embodiment.

In this embodiment, the high pressure pump 111 is mounted apart from the body of the engine 52. As a result, the drive cam 113 is provided on a separate high pressure pump drive shaft 151. A drive pulley 152 is affixed to the upper end of this shaft 151 and is driven by a timing belt 153 from a pulley 154 that is fixed to the upper end of the crankshaft 57 at a point above the flywheel magneto 92.

The lubrication system for the high pressure pump 111 is provided by encasing the drive assembly within a transmission casing 155 as seen in FIG. 8. This transmission casing 155 carries upper and lower bearings 156 and 157 which journal the pump drive shaft 151.

A lower wall of this transmission housing 155 is provided with a drain passage 158 that drains lubricant which is delivered to its interior in a manner to be described back to an oil reservoir 160 for the main engine lubricating system. This system is shown best in this figure, and includes a pump 159 which is driven by a worm gear 161 that is enmeshed with a worm wheel 162 that is fixed to the lower end of the crankshaft 57 above a lower oil seal 163 and lower main bearing 164 for the crankshaft 57.

The pump 159 delivers the lubricant drawn from the reservoir 160 to the intake manifold port 122 for delivery to the induction system and crankcase chamber 69. The pump 59 outputs this fluid through a check valve 165 so as to ensure that fluid will only flow from the reservoir 160 through the pump 159 to the discharge nozzle 122.

The oil which has lubricated the bearings 164 and other elements in the crankcase chamber 69 will drain to a well 166 formed above the lowermost oil seal 163. Oil is forced from this well through a lubricating line 167 to the gear chamber within the transmission housing 155 when compression is occurring in the lower section of the crankcase chamber 69. The thus pumped oil enters the transmission case 155 through an inlet port 168.

A one-way check valve 169 permits flow in this direction when the compression is occurring in the lower section of the crankcase chamber 69. On the intake cycle for this section of the crankcase chamber 69, the check valve 169 will close and any accumulated oil in the transmission case 155 will drain back to the oil reservoir 160 through the drain line 158. As a result, the transmission that drives the high pressure pump 111 will be lubricated in this embodiment also even though the driving mechanism is removed from the engine crankcase chamber 69.

Figure 9:
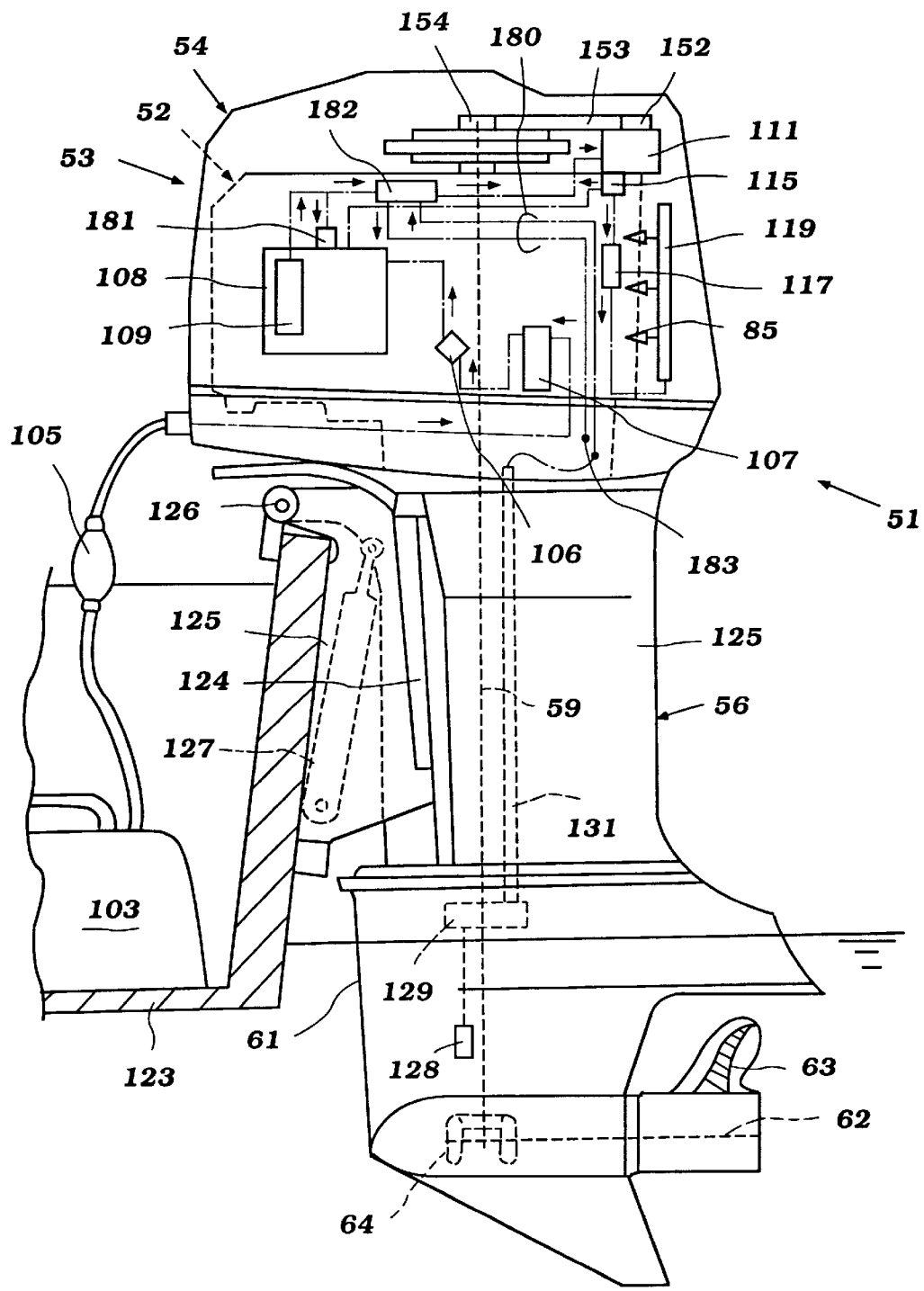
FIG. 9 is a side elevational view of an outboard motor constructed in accordance with another embodiment of the invention as attached to the transom of an associated watercraft that is shown partially and in cross section. (Third Embodiment)
Figure 10:
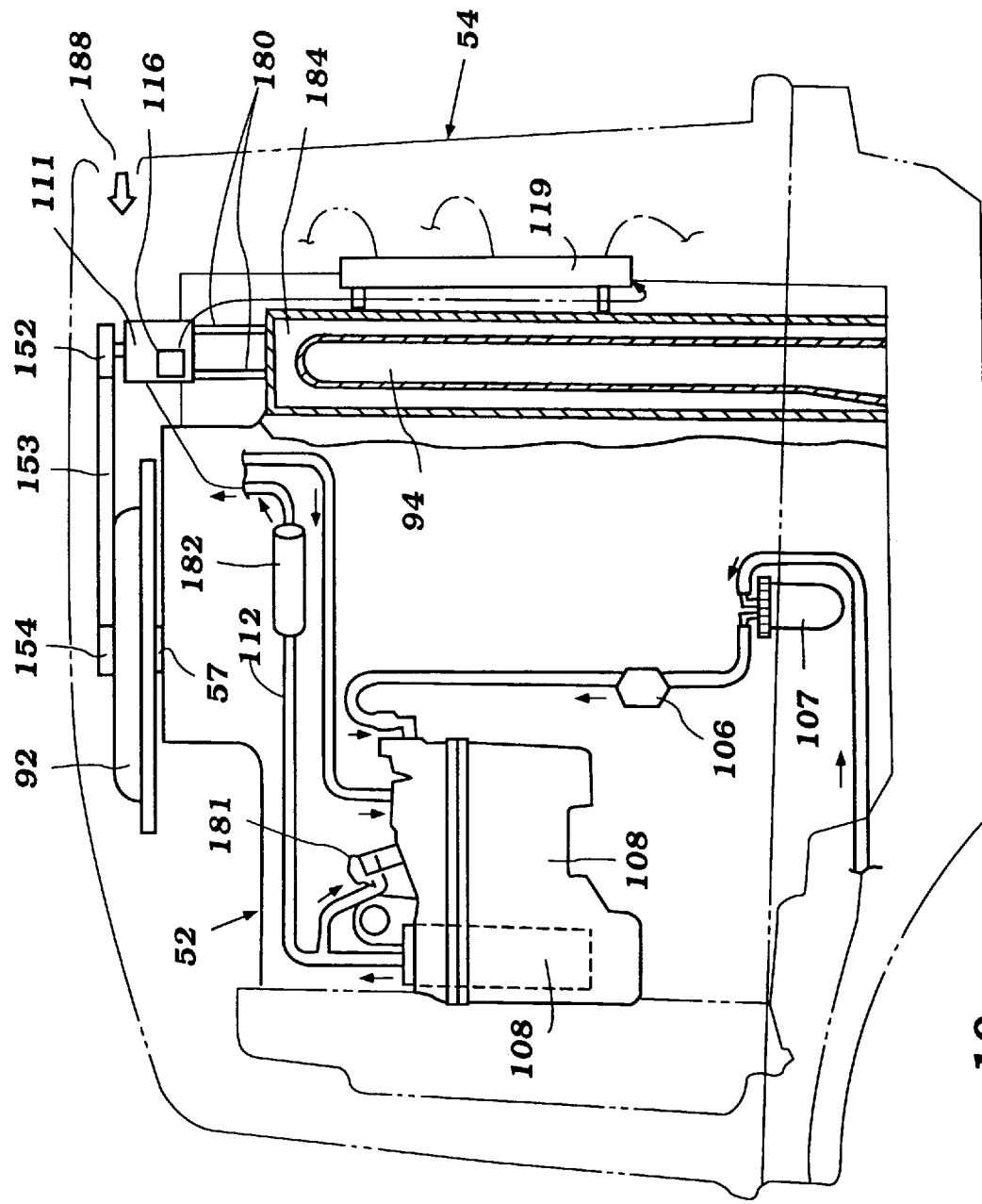
FIG. 10 is a side elevational view of the power head of the outboard motor shown in FIG. 9, with the protective cowling being shown in phantom and with portions of the engine broken away to show in more detail the construction. (Third Embodiment)
Figure 11:
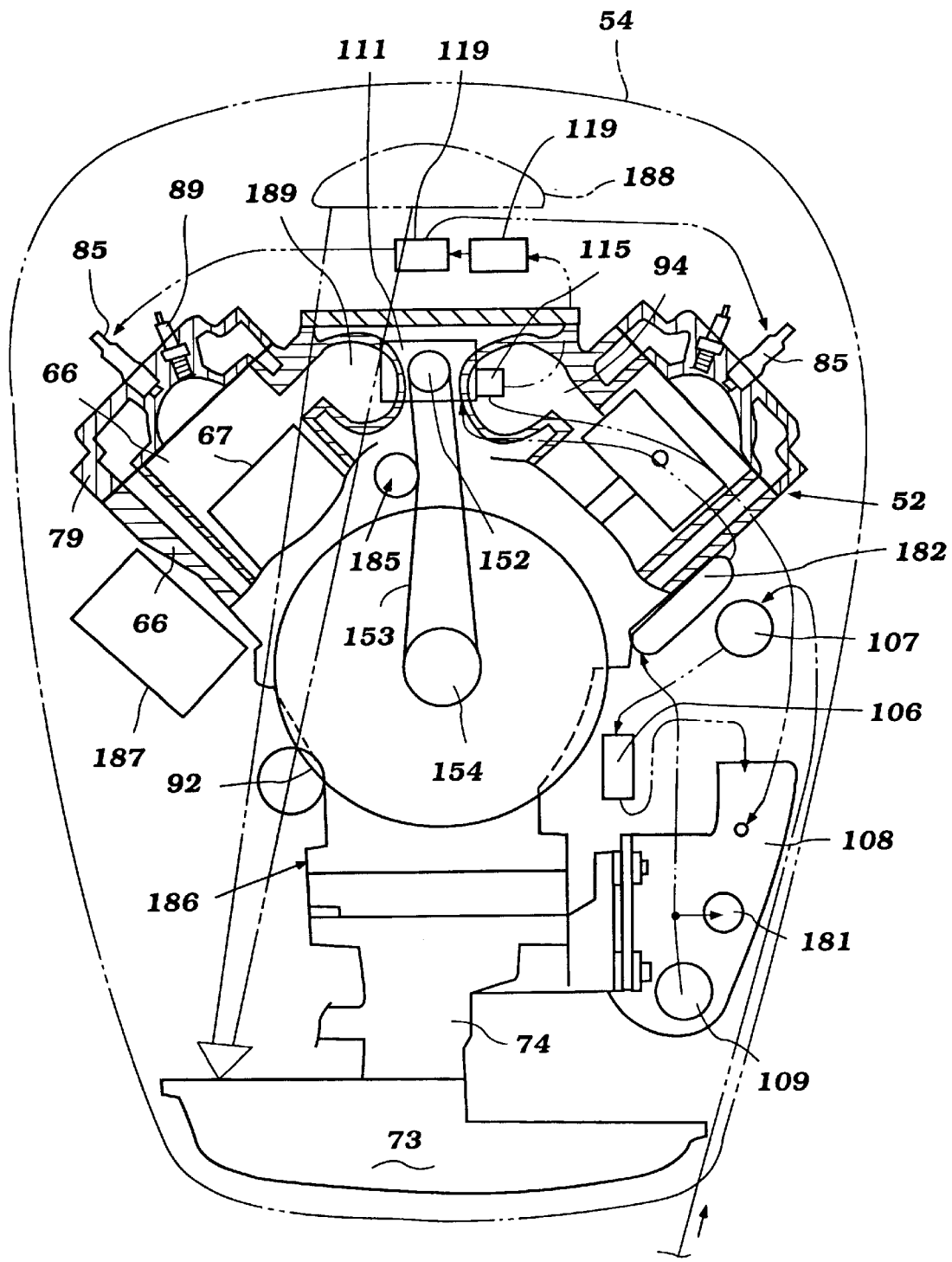
FIG. 11 is a top plan view of the power head of this embodiment, with the protective cowling being shown in phantom and portions of the engine broken away and shown in section. (Third Embodiment)

Embodiment of FIGS. 9–11

Referring first to FIG. 9, this figure illustrates further details of the general construction of the outboard motor 51 and those further details will be described first. However, where components of this embodiment are the same as embodiments previously described, they had been identified by the same reference numerals and will be described again only insofar as is necessary to understand the construction and operation of this embodiment.

The associate watercraft is shown in this drawing and is identified generally by the reference numeral 123. The attachment of the outboard motor 51 to the transom of the watercraft 123 is provided by a conventional mechanism which was not described in detail in reference to FIG. 3 but will now be done by reference to FIG. 9.

This includes a swivel bracket 124 in which a steering shaft (not shown) is supported for steering movement of the outboard motor 51 about a vertically extending steering axis. This steering shaft is affixed to the outer housing 125 of the lower unit assembly 56 in a known manner.

The swivel bracket 124, in turn, is pivotally connected to a clamping bracket 125 by means of a pivot pin 126. The clamping bracket 125 includes a device for detachably connecting it to the watercraft hull 123. Pivotal movement about the pivot pin 126 accommodates tilt and trim movement of the outboard motor 51 about this horizontal axis in a manner well known in this art.

In addition, a hydraulic device 127 may be interposed between the clamping bracket 125 and swivel bracket 124 to either control or effect this movement. Such devices are well known in this art and since they form no part of the invention, further description of them is not believed to be necessary to permit those skilled in the art to practice the invention.

The engine 52 of this and all embodiments including that previously described is water cooled. For this purpose, cooling water is drawn from the body of water in which the watercraft operates through a water inlet opening 128 formed in the outer housing of the lower unit 61. This water is drawn by a water pump 129 that is driven off the driveshaft 59 at the interface between the outer housing units 125 and 61 of the driveshaft housing assembly 56. The water is then delivered upwardly through a water supply conduit 131.

This embodiment also includes a low pressure stage fuel pressure regulator 181 that communicates with the outlet side of the electric fuel pump 109 and regulates the pressure delivered to the high pressure fuel pump 111 by dumping fuel back into the vapor separator 108.

The supply line to the high pressure fuel pump 111 in this and also in other embodiments may be provided with a fuel cooler or heat exchanger 182. Some of the cooling water delivered by the water pump 129 through the supply line 131 passes to and from this fuel cooler through cooler coolant lines 180 which comprise both a delivery line and a return line. This coolant water is dumped back into the body of water in which the watercraft 123 is operating through a return discharge 183. Coolant is also delivered to the cooling jackets of the engine from the conduit 131 and these may include a cooling jacket 184 in the engine body that cools the exhaust manifold 94.

Referring to FIG. 11, it will be seen that the drive belt 123 for driving the high pressure pump pulley 122 is provided with an idler pulley 185 that serves to maintain the desired tension on this pulley. Also seen in this figure, is a starter motor 186 that is mounted on the engine and which has a starter gear that is engaged with a ring gear on the flywheel magneto assembly 92 for electric starting of the engine.

Also seen in FIG. 11 is an electrical control box (ECU) 187 which is mounted on one side of the cylinder block 66 adjacent one of the cylinder banks and which contains electronic controls for engine management. A type of management system which may be executed by the ECU 187 will be described in connection with the embodiment of FIGS. 16–20.

Before leaving this embodiment, FIGS. 10 and 11 also show the aforenoted mentioned air inlet opening for in the protective cowling 54. This air inlet opening is identified by the reference numeral 188 in this figure. It will be seen that it is positioned relative to the air inlet device 73 so that the air flowing into the protective cowling will be in the direction indicated by the open arrow 189 and will flow across the high pressure fuel pump 111 so as to provide some cooling for it.

Figure 12:
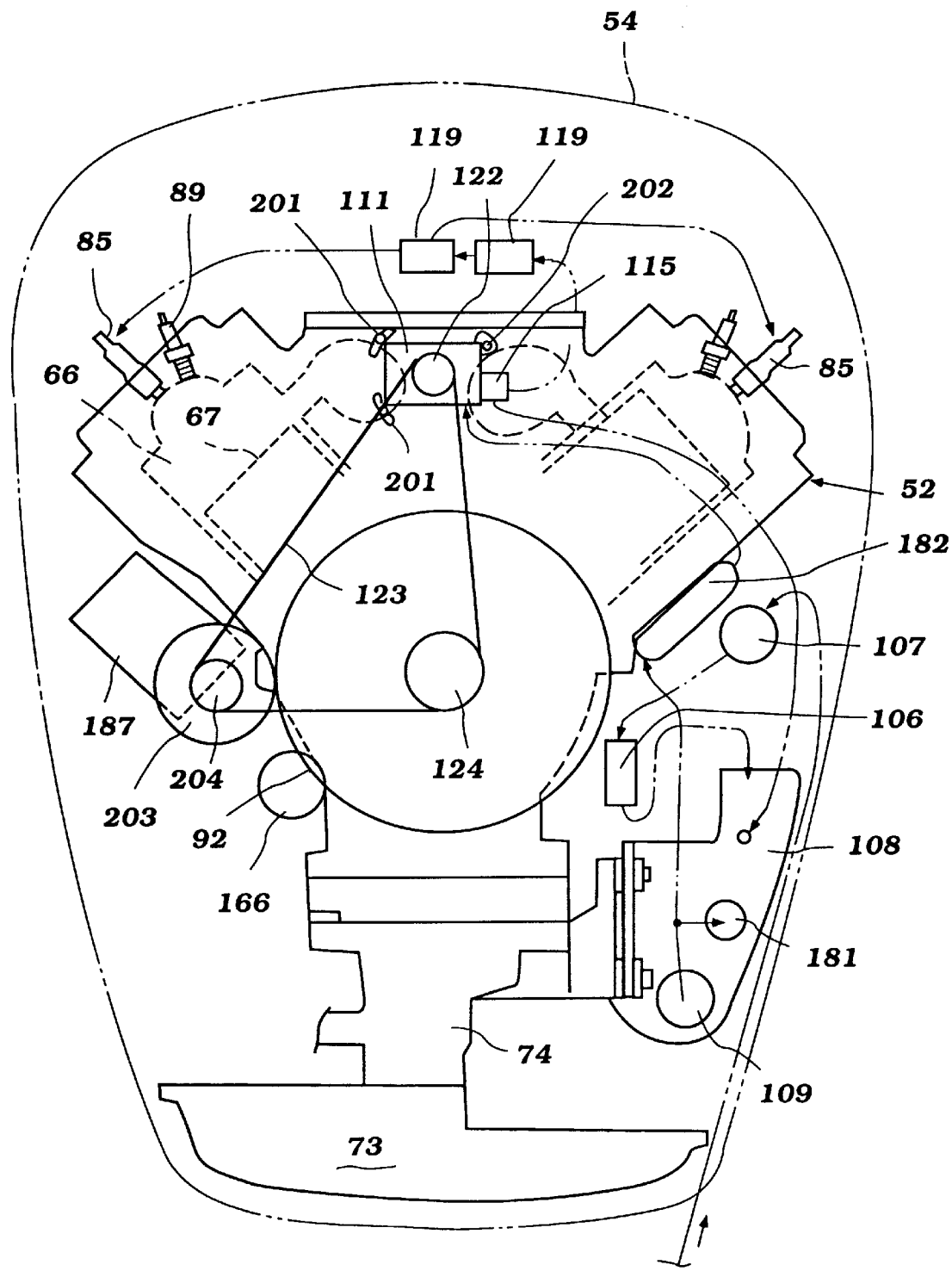
FIG. 12 is a view, in part similar to FIG. 11, and shows another embodiment of the invention which differs from the embodiment of FIGS. 9–11 only in the layout of the various components associated with the engine. (Forth Embodiment)

Embodiment of FIG. 12

This embodiment differs from the previously described embodiment in two regards. First, the idler pulley is eliminated and the tension on the drive belt 123 is controlled by providing an adjustable mounting for the high pressure pump 111. This adjustable mounting comprises slotted openings 201 in a mounting bracket for the high pressure pump 111 that permits it to be pivoted about a fixed pivot mounting 202 so as to change the tension on the drive belt 123.

Also, this embodiment also shows an alternator 203 having a drive pulley 204 which is also driven by the drive belt 123. The alternator 203 can generate electricity for various purposes including to supply electrical devices in the associated watercraft.

Figure 13:
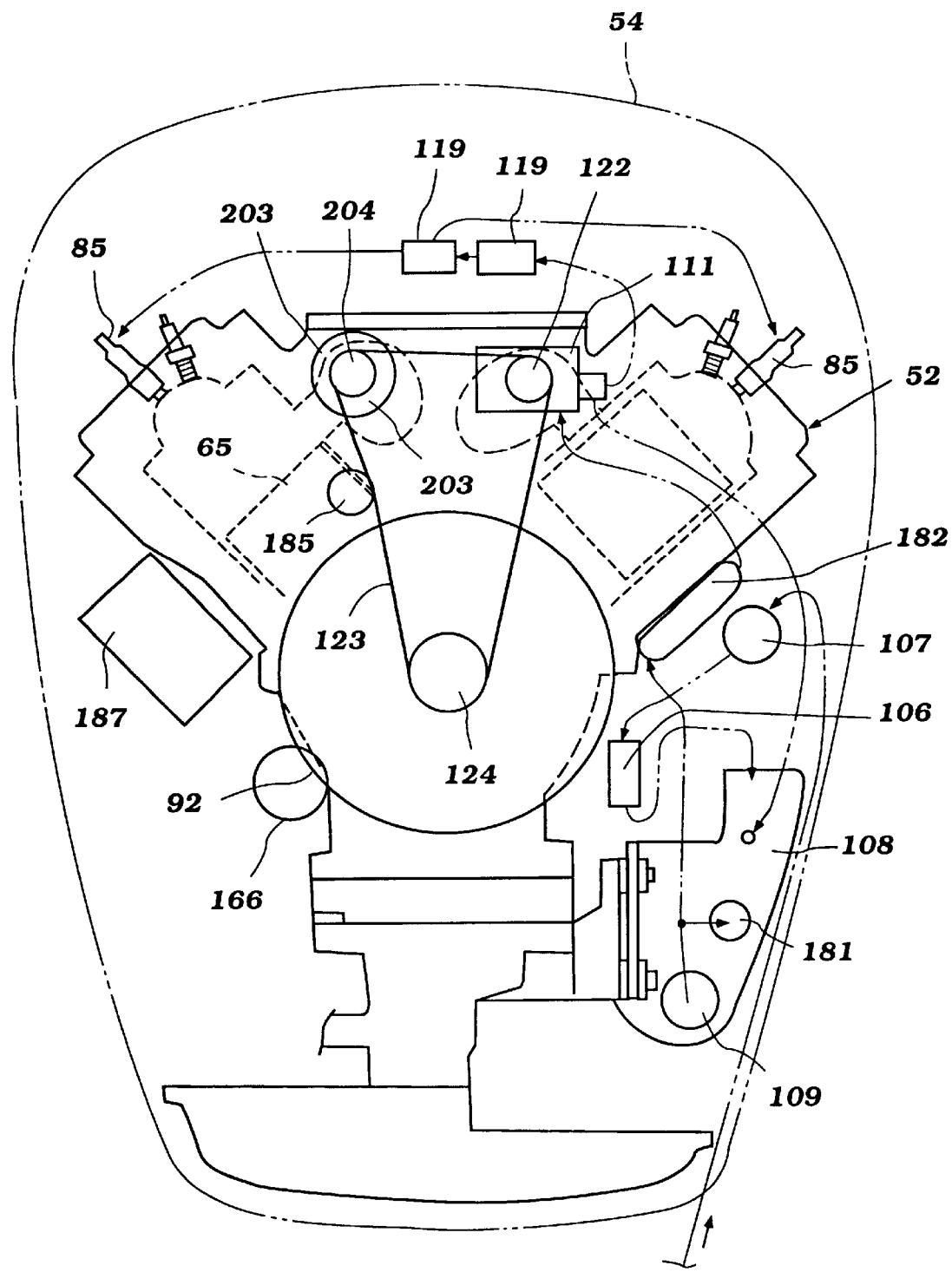
FIG. 13 is a top plan view, in part similar to FIGS. 11 and 12, and shows another embodiment of component layout. (Fifth Embodiment)

Embodiment of FIG. 13

FIG. 13 shows another embodiment which is basically the same as the embodiment of FIG. 12. In this embodiment, however, the alternator 85 is moved to one side of the valley between the cylinder banks. Thus, the high pressure pump 111 is moved to the other side of the valley so that the alternator 203 and high pressure pump 111 are both positioned in the valley area. Thus, the tensioning pulley 185 is used in this embodiment.

Figure 14:
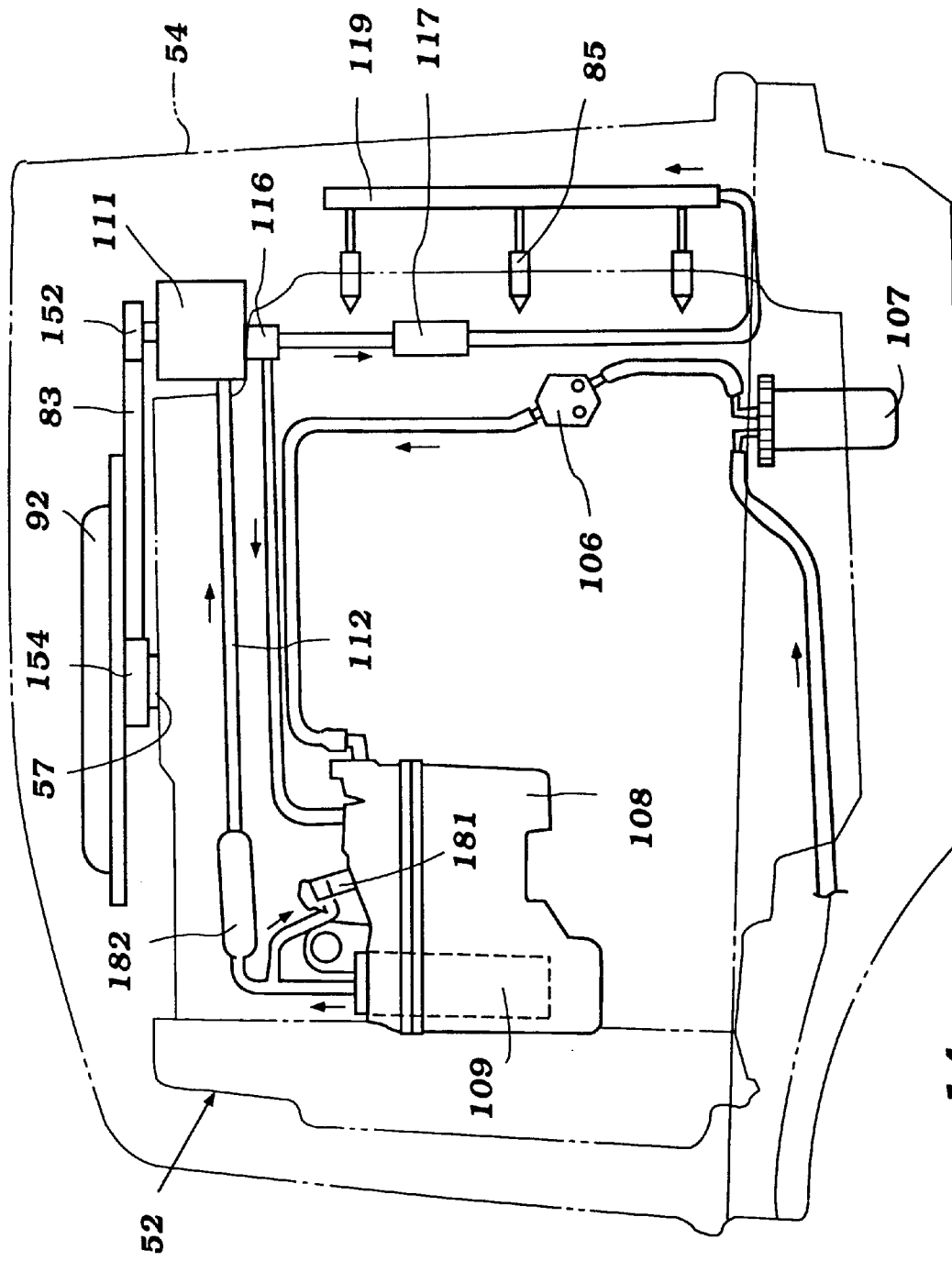
FIG. 14 is a side elevational view, in part similar to FIG. 9 but shows a different layout for the components and thus constitutes a further embodiment of the invention. (Sixth Embodiment)
Figure 15:
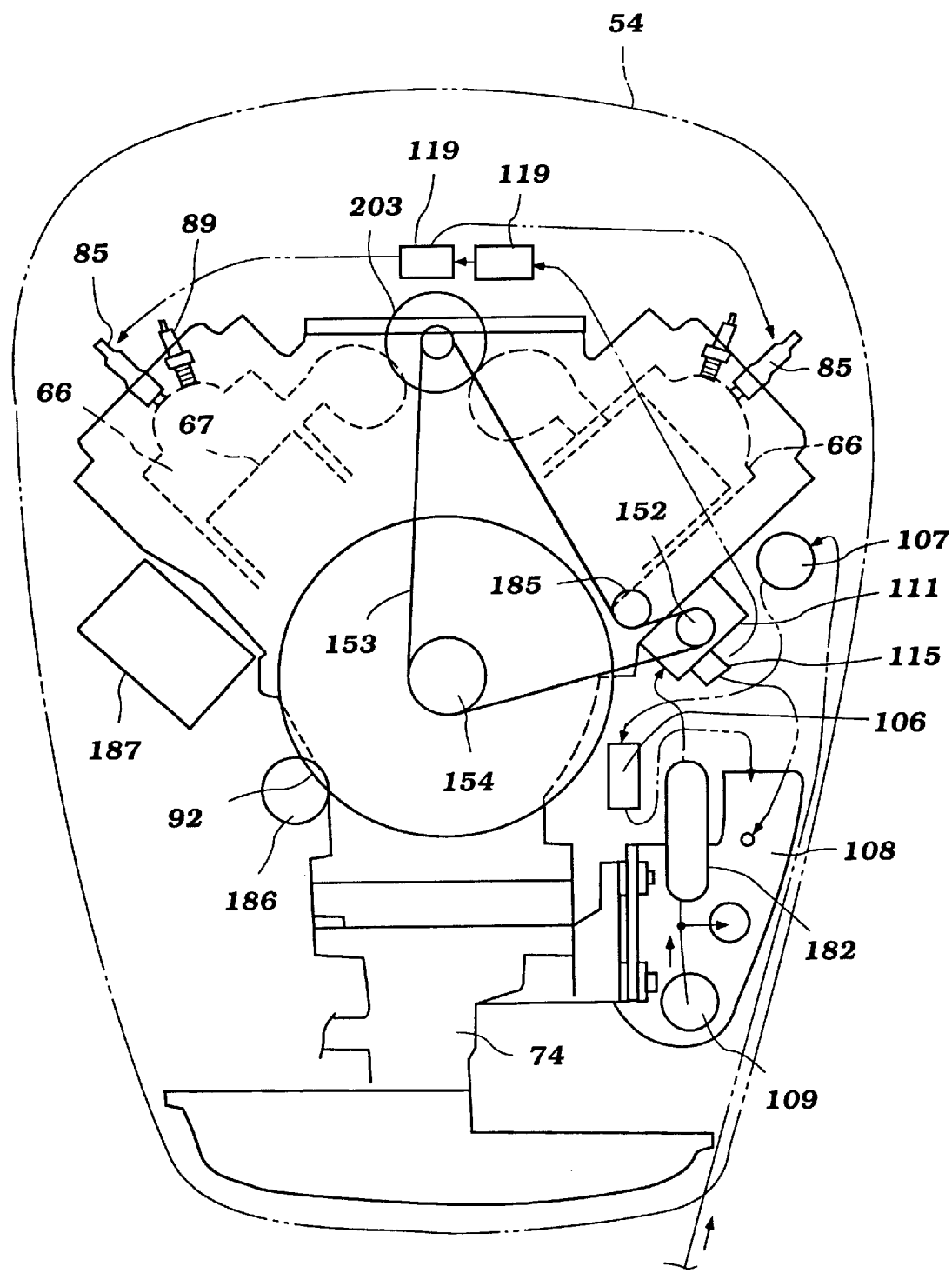
FIG. 15 is a top plan view, in part similar to FIGS. 11–13, and shows yet another component layout that may be utilized in connection with this embodiment. (Seventh Embodiment)

Embodiment of FIGS. 14 and 15

This embodiment is similar to the embodiments of FIGS. 9–11, 12 and 13 and differ from them primarily in the location of the various components. In this embodiment, the alternator 203 is positioned in the center of the valley between the cylinder banks and the high pressure fuel pump 111 is moved to one side of one of the cylinder banks and particularly the side where the vapor separator 108 is positioned. This reduces to some extent the length of the fuel lines. Also, this device repositions the tensioning pulley 185 to a point adjacent the drive pulley 152 of the high pressure pump 111.

In all other regards, this embodiment is the same as those previously described and, therefore, further description of this embodiment is not believed to be necessary to permit those skilled in the art to practice the invention.

Embodiment of FIGS. 16–20

In all of the embodiments as thus far described, the drive cam for operating the pump plunger has rotated about a vertically extending axis that was parallel to or which included the crankshaft axis. There is a widely used type of automotive high pressure pump, however, that has horizontal input shaft and as such if this pump is to be employed in an outboard motor in its normal orientation, must be driven by some form of right angle drive.

Next will be described an embodiment of this type and in this embodiment, most of the components are of the type previously described. Where that is the case, these components have been identified by the same reference numerals and will not be described again, except insofar as is necessary to understand the construction and operation of this embodiment.

Figure 16:
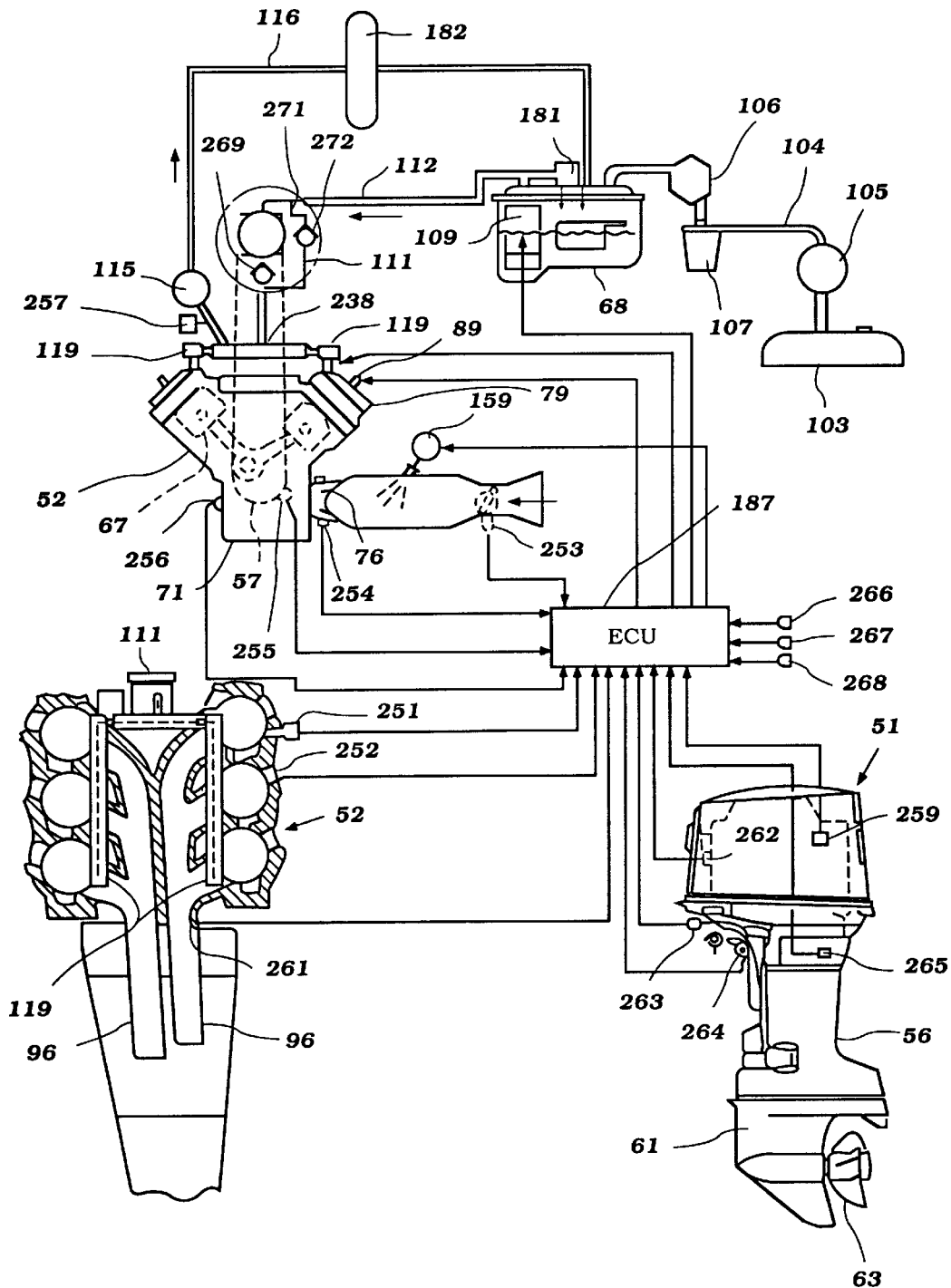
FIG. 16 is a multi-part view showing: in the lower right hand portion, an outboard motor constructed in accordance with another embodiment, on a reduced scale: in the lower left hand portion, a rear elevational view of the outboard motor with portions removed so as to more clearly show the construction of the engine: and in the upper view, a top plan view of the engine of the outboard motor with its induction and fuel injection system shown in part schematically. The ECU for the motor links the three views together. (Eighth Embodiment)
Figure 17:
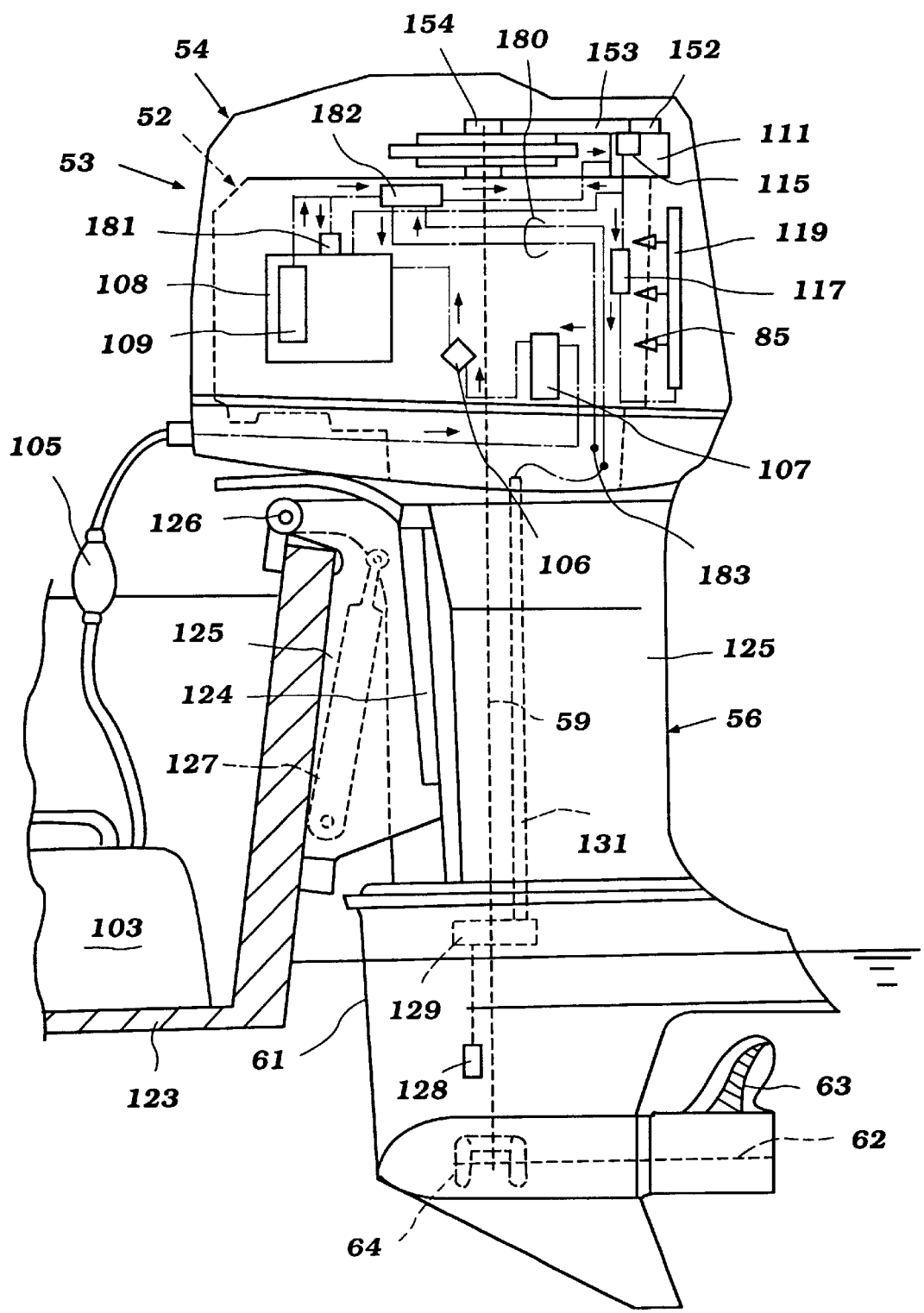
FIG. 17 is an enlarged side elevational view of the outboard motor as shown in the lower right-hand side of FIG. 16 attached to the transom of an associated watercraft, which is shown partially and in phantom, and with certain of the flow paths of the fuel and coolant shown schematically. (Eighth Embodiment)

In this embodiment, the control system for the engine management is also illustrated and that will be described generally. As noted in description of the previous embodiments, there is an electronic control unit which appeared first in FIG. 11 and which was identified by the reference numeral 187. The schematic representation of that control unit or one of its components is shown in FIG. 16 where it is labeled as ECU.

This ECU 187 receives certain signals for engine control, which will be described shortly. It utilizes this information so as to control the operation of the fuel injectors 85, the firing of the spark plugs 89, the control for the electric fuel pump 109 and the lubricating pump, previously identified by the reference numeral 159. The specific control strategy employed may be of any known type.

However, in order to facilitate understanding of this concept and also to practice the invention in conjunction with such varying types of control systems, specific examples will be given of sensors and sensed conditions which may be utilized in the description of this embodiment.

Basically, the engine management system is of a feedback control type and hence, it employs a combustion condition sensor, indicated generally by the reference numeral 251. An oxygen ($O_2$) sensor is a type of sensor that may be utilized for this purpose. The oxygen sensor 251 is positioned in proximity to one of the exhaust ports of at least one of the cylinders of the engine so as to output a signal indicative of the residual air amount. This will permit adjustment of the fuel air ratio to maintain the desired ratio.

Engine temperature is measured by an engine temperature sensor 252 that is positioned in proximity to one of the engine cooling jackets.

Throttle demand or load is measured by a throttle position sensor 253 that cooperates with one of the shafts for one of the throttle valves 75.

Intake air temperature is sensed by a temperature sensor 254 in one of the intake ports 76.

Crank angle or rotary position of the crankshaft 57 is sensed by a crank angle sensor 255. By comparing crank angle with time, engine speed also may be determined by this sensor.

Crankcase pressure is sensed by a crankcase pressure sensor 256. It has been found that crankcase pressure is a good indicator of intake air volume and thus, this parameter can be determined by this type of sensor.

Also, there is provided a pressure sensor 257 in the fuel supply system and in a main fuel manifold, indicated by the reference numeral 258 and which supplies fuel to the individual fuel rails 119. This sensor is placed upstream of the main pressure regulating valve 115.

The temperature of the water which is drawn from the body of water for engine cooling by the aforenoted coolant supply system is sensed by a intake water temperature sensor 259.

Exhaust back pressure is sensed by an exhaust back pressure sensor 260 which may be mounted in either the exhaust guide plate 55 or the upper portion of one of the expansion chambers 97.

A vibration sensor 262 may be provided so as to sense engine vibrations to determine uneven running or a like condition.

If the mounting for the outboard motor 51 also includes a height adjustment, a height position sensor 263 may be provided. Trim angle is sensed by a trim angle sensor 264.

The condition of the forward neutral reverse transmission 64 is determined by a neutral sensor switch 265.

Some ambient conditions or watercraft conditions may also be sensed and these include a vessel speed sensor 266, a trim or posterior angle sensor 267 and an atmospheric pressure sensor 268.

As aforenoted, the described sensed conditions are only typical of those which may be employed for engine management and other conditions may be employed or lesser numbers of conditions by those skilled in the art to practice the invention.

Figure 19:
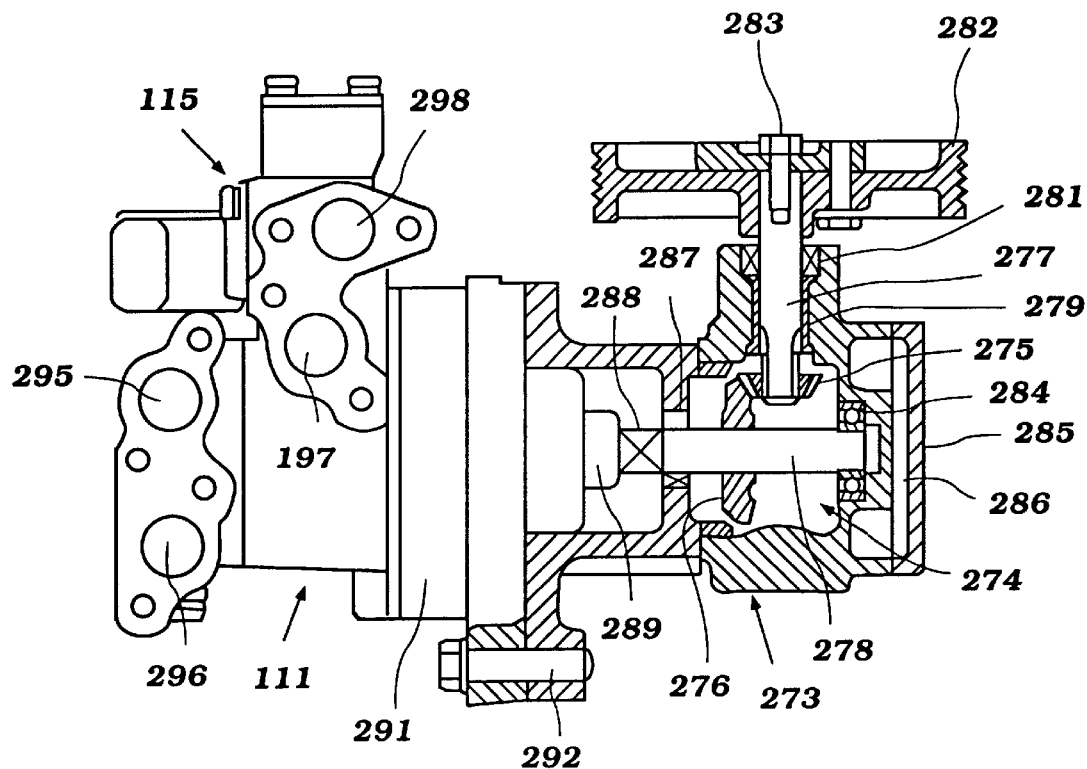
FIG. 19 is an enlarged view of the high pressure pump looking in the direction of the arrow 19 in FIG. 18 and with a portion of the pump transmission broken away and shown in section. (Eighth Embodiment)
Figure 20:
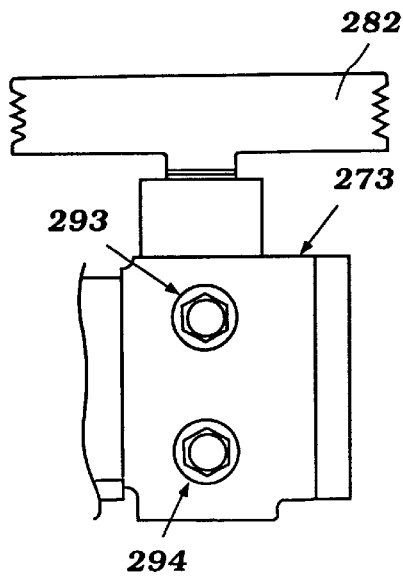
FIG. 20 is an enlarged side elevational view of the pump transmission and showing the lubricant servicing arrangement associated therewith. (Eighth Embodiment)

In this embodiment, the high pressure pump, indicated here again by the reference numeral 111, but which has a construction different from those previously described, as will become apparent later by reference to FIGS. 19 and 20, is provided with a check valve arrangement comprised of a first check valve 269 in the outlet side of the high pressure pump 111 upstream of the main fuel manifold 258. There is also provided a bypass line 271 that extends from the low pressure pump outlet conduit 112 around past the high pressure pump check valve 269 to the delivery line 118 which serves the main fuel manifold 258. A second check valve 272 is positioned in this line.

This check valve arrangement permits testing of the low pressure system by running it when the engine 52 is not running. At this time, the check valve 269 will held closed and hence the pressure sensor 257 can be utilized to check the integrity of the lower pressure side of the system.

When the high pressure pump 111 is operating due to engine rotation, then the check valve 269 will open and the check valve 272 will close to avoid bypassing of the fuel. The pressure sensor 257 then can be used to check the integrity of the high pressure side of the system.

Figure 18:
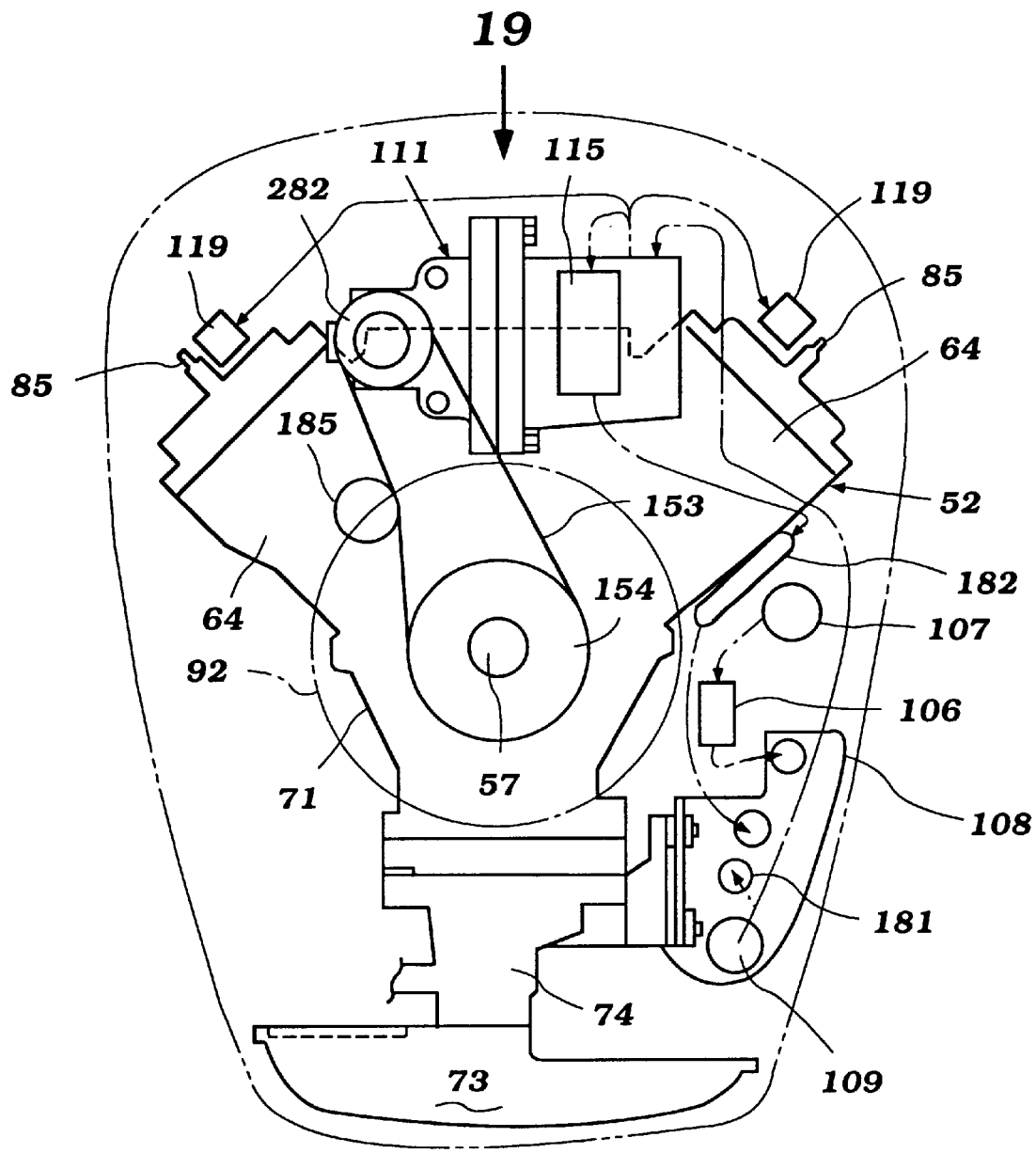
FIG. 18 is a top plan view of this embodiment showing the power head with the protective cowling in phantom and thus, is in part similar to FIGS. 11–13 and 15. (Eighth Embodiment)

The detailed construction of the high pressure pump 111 of this embodiment will now be described primarily by reference to FIGS. 18–20 with the emphasis being on the latter two figures. The pump assembly 111 includes a transmission housing assembly 273 which defines a transmission cavity 274 in which a pair of intermeshing bevel gears 275 and 276 are positioned so as to transfer drives from a vertically extending transmission input shaft 277 to a horizontally extending pump drive shaft 278.

The transmission input shaft 277 is journaled in a plain bearing 279 with an oil seal 281 at its upper end. A drive pulley 282 is fixed to the upper end of the transmission input shaft by means including a threaded fastener 283. The drive pulley 282 is driven by the drive belt 153 as in the previously described embodiments.

The pump drive shaft 278 is journaled by a first ball bearing 284 in an outer end plate assembly 285. This outer end plate assembly 285 is formed with a cooling jacket 286 through which engine coolant may be circulated from the previously described coolant circulating system.

On the other side of the cavity 274, a plain bearing 287 journals the pump drive shaft 278. A coupling 288 couples the pump drive shaft 278 with a cam driving shaft 289 of the high pressure pump 111.

The pumping mechanism 111 is contained within a pump housing 291 that includes one or more plungers and operating tappets that are associated with a cam that rotates about a horizontally extending axis. The pump housing 291 is connected to the transmission housing 273 by threaded fasteners 292.

Preferably, the pump cavity 274 is partially filled with a hydraulic gear lube of a suitable type. This gear lube can be added or checked through a fill opening closed by an upper plug 292 and drained through a lower, service opening closed by a drain plug 293.

Referring now primarily to FIG. 19, it should be seen that the head end of the pump housing 291 is formed with an inlet fitting 294 that is connected to the line 112 from the electric pump 109. The pressure outlet located vertically below this inlet fitting 294 is comprised of an outlet fitting 296 that communicates with the line 114. Because the inlet fitting 295 is above the outlet fitting 296, any air that might collect in the system during shutdown will automatically be bled from the system during startup to avoid air pockets.

In this embodiment, the pressure regulating valve 115 is mounted directly as a unit with the pump housing 291. It has an inlet fitting 297 that is teed off of the pump outlet 296 and a return fitting 298 that is connected back to the pressure return conduit 116 to the vapor separator 108.

Figure 21:
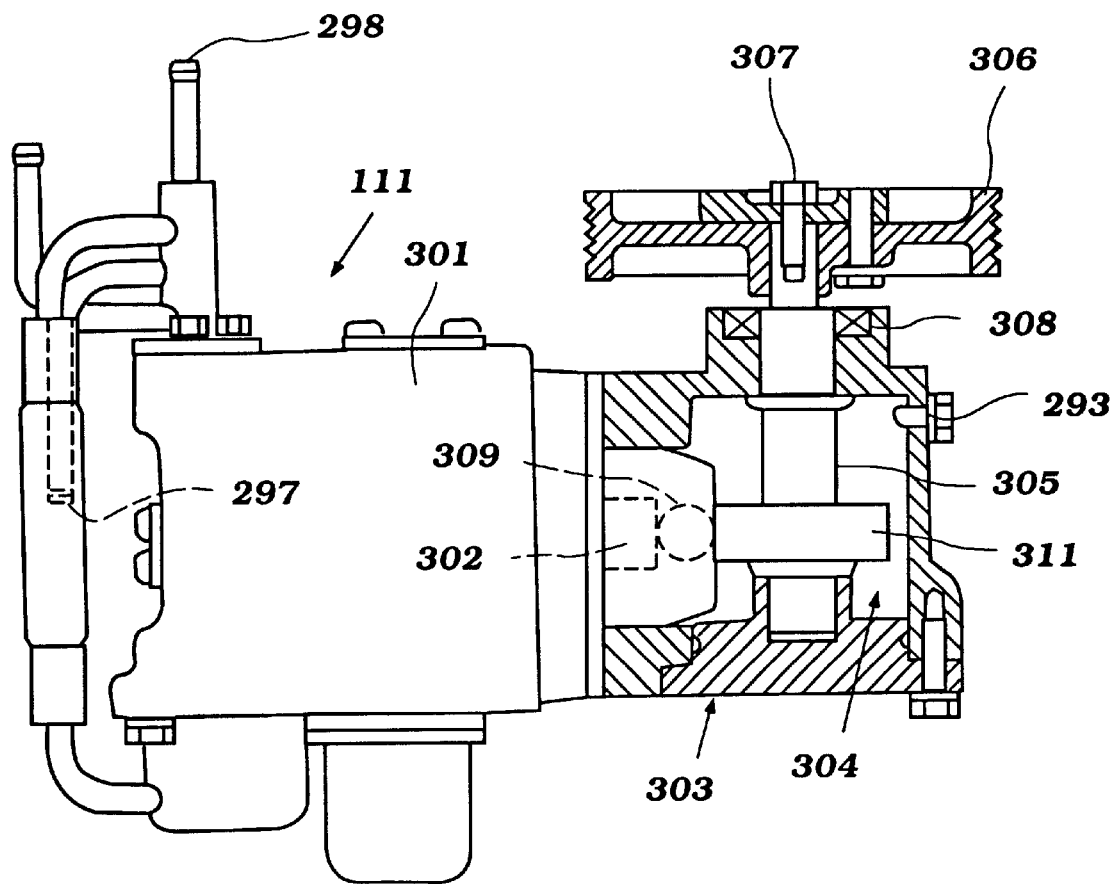
FIG. 21 is a view, in part similar to, FIG. 19 but shows another embodiment of the invention. (Ninth Embodiment)

Embodiment of FIG. 21

This figure illustrates in a single view another embodiment of high pressure pump 111. This type of embodiment is like the previously described embodiment in that the high pressure release valve 115 is built into the main pump housing, indicated in this embodiment by the reference numeral 301. However, in this embodiment, the pump plunger, indicated at 302, extends outwardly from this housing 301 into a transmission housing, indicated generally by the reference numeral 303.

The transmission housing 303 defines an internal cavity 304 in which a cam shaft 305 rotates about a vertically extending axis. This cavity 304 may be provided with fill and drain openings and plugs as in the previously described embodiment, one of which appears in FIG. 21 and has been identified by the same reference numeral as applied to a like component in the previous embodiment.

The camshaft 305 has a pulley 306 affixed to its upper end by means that include a threaded fastener 307. The pulley drives the camshaft 305 from the drive valve 123. An oil seal 308 is provided in an upper wall of the housing assembly 303.

A tappet 309 is interposed between a cam 311 fixed to the camshaft 305 and the pump plunger 302 for transmitting drive to it. In all other regard, this embodiment is the same as those previously described and, for that reason, further description of this embodiment is not believed to be necessary to permit those skilled in the art to practice the invention.

Embodiment of FIGS. 22–24

Another embodiment of high pressure pump is illustrated in FIGS. 22–24 and is again indicated generally by the reference numeral 111. The pump assembly is the same as the embodiment of FIG. 21 and thus its housing is indicated by the same reference numeral 301 as is its pump plunger 302 and the tappet 309.

With this embodiment, however, the camshaft, indicated by the reference numeral 351, rotates about a horizontally extending axis that is disposed at a right angle to that of the pump plunger 302. This camshaft 351 is rotatably journaled in a pump transmission assembly 352 and within an internal cavity 353 thereof. The camshaft 351 has a cam portion 354 having a shape as shown in FIG. 24. This defines cam lobes 354A so as to provide four pumping strokes per rotation of the camshaft 351.

A bevel gear 355 is also affixed to the camshaft 351 and is in mesh with a driving bevel gear 356. This gear is affixed to a pump drive shaft 357 which extends vertically and to which the drive pulley 306 is affixed by means that includes the threaded fastener 307. Although not shown in these figures, the transmission housing 352 may also be provided with fill and drain openings closed by fill and drain plugs, as previously described.

Figure 25:
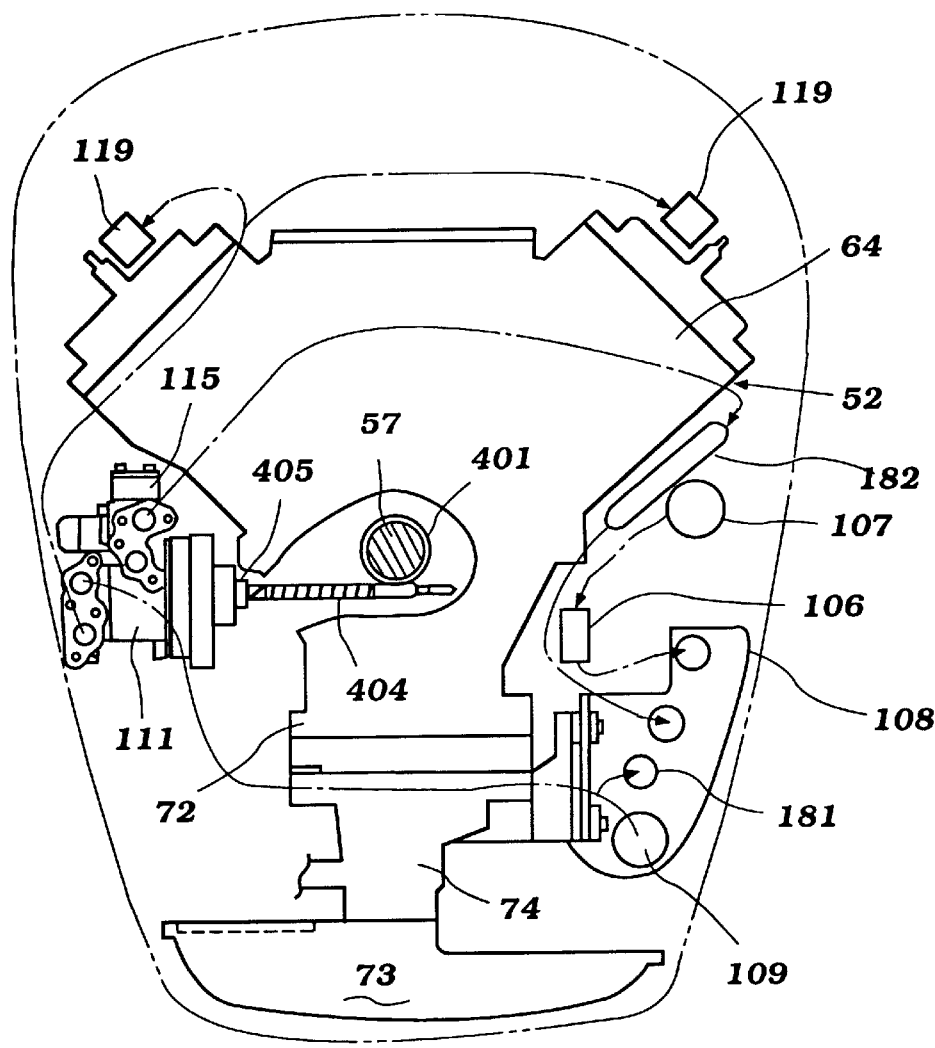
FIG. 25 is a top plan view, in part similar to FIGS. 4, 11, 12, 13, 15, and 18 and shows another embodiment of the invention, with a portion of the engine broken away so as to show in more detail the pump driving arrangement of this embodiment. (Eleventh Embodiment)
Figure 26:
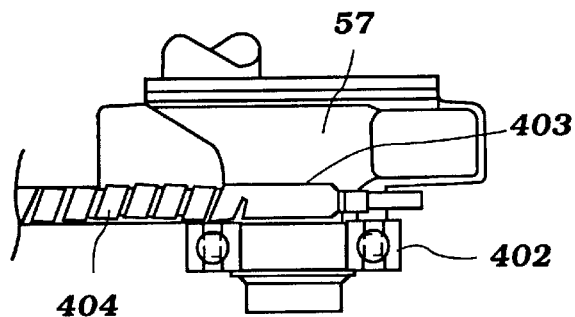
FIG. 26 is an enlarged cross-sectional view of the structure that is broken away in FIG. 25 but taken along a plane extending perpendicular thereto to show in more detail the driving arrangement for the pump of this embodiment. (Eleventh Embodiment)
Figure 27:
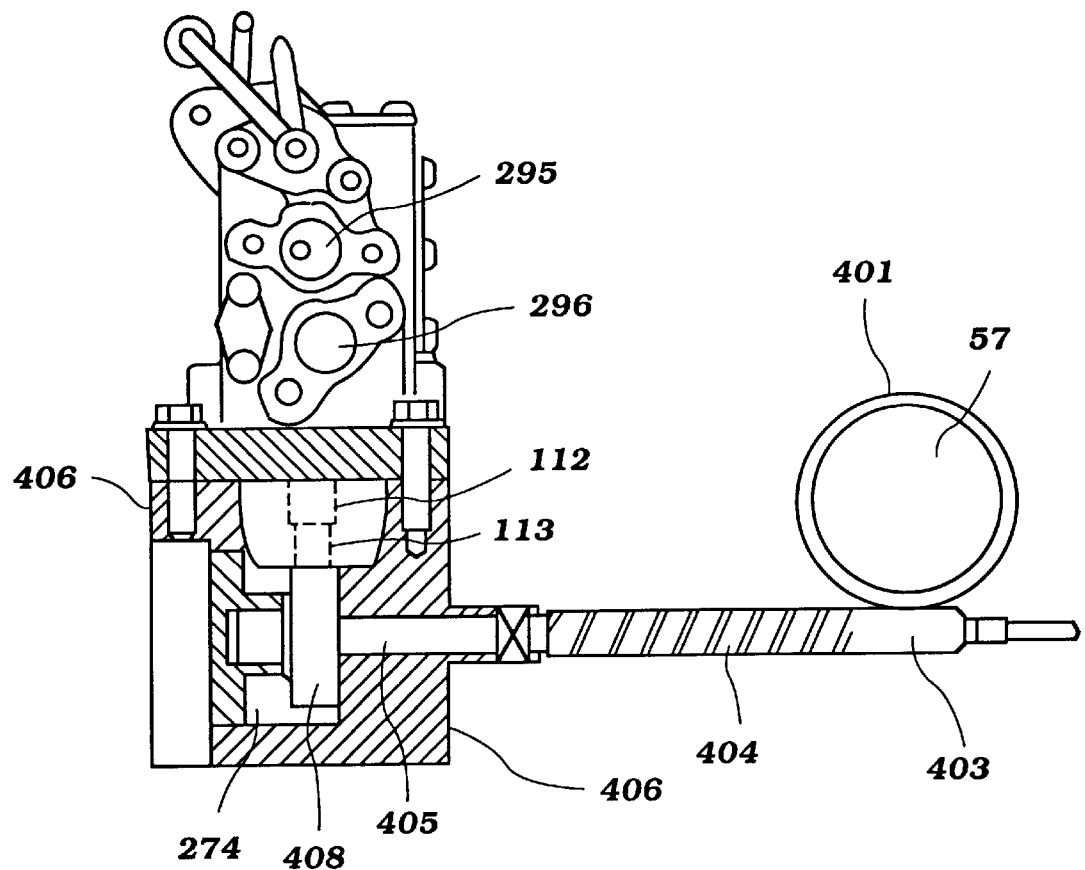
FIG. 27 is an enlarged view looking in the same direction as FIG. 25 and showing only the pump and pump drive with portions thereof being broken away and shown in section. (Eleventh Embodiment)

Embodiment of FIGS. 25–27

These figures illustrate an embodiment wherein any of the previously described types of high pressure pumps may be driven directly from the camshaft without using a flexible transmitter drive and hence, is similar in some regard to the embodiment of FIGS. 1–6. However, any of the high pressure pump as shown in any previously described embodiment may be driven in the manner which will now be described.

As may be seen, the lower end of the crankshaft 57 is machined to form a worm wheel 401. This worm wheel 401 is formed immediately above the lower main bearing 402 for the crankshaft 57.

A worm gear 403 is formed on a flexible drive shaft 404 which may be formed something like a speedometer drive cable and transmits drive from the worm gear 403 to a pump input shaft 405 that is mounted in a pump housing 406 and which may contain any type of pump mechanism as already described. The pump plunger 112 is operated by a tappet 113 operated, in turn, by a cam 407 on the pump input shaft 405.

Figure 28:
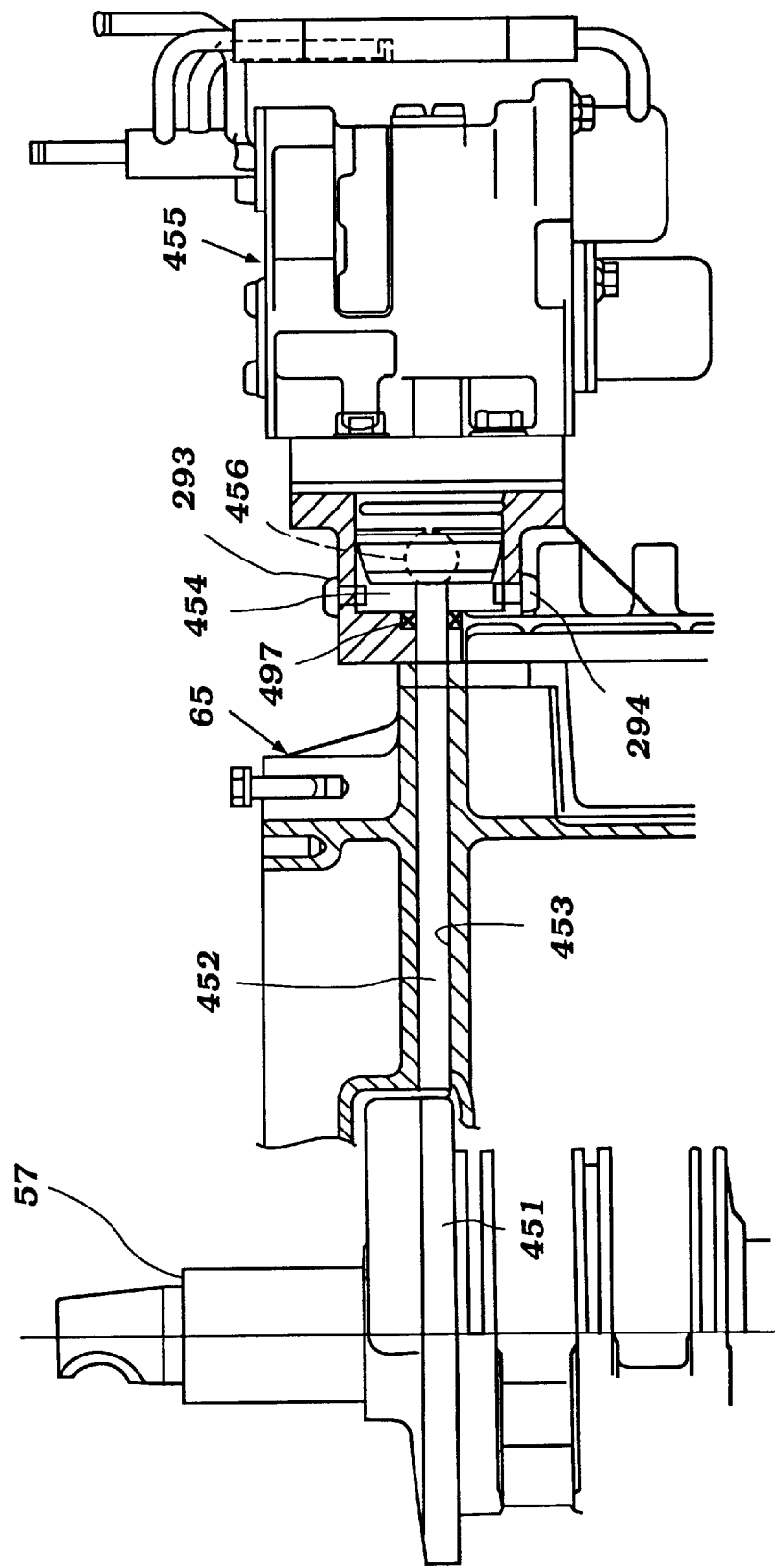
FIG. 28 is an enlarged, partial cross-sectional view showing yet a further embodiment of the invention. (Twelfth Embodiment)

Embodiment of FIG. 28

FIG. 28 shows another direct drive mechanism by which any of the previously described types of pumps may be driven. This mechanism employs a cam 451 that is formed integrally on the crankshaft 57 at its upper end. A push rod 452 is journaled in a bore 453 formed in the upper end of the cylinder block 65 and extends into a cavity 454 of a high pressure pump 455 having an operating tappet 456 and which may be of any type previously described. An oil seal 457 encloses the cavity 454 and it may be filled with lubricant and have drain and fill plugs as previously described indicated by the same reference numerals previously used.

From the foregoing description, it should be readily apparent that the described embodiments all provide mechanical drives for high pressure pumps that permits the use of a reciprocating pump with its pump plunger or input shaft operating about a horizontally extending axis. Various driving arrangements are disclosed as well as arrangements for lubricating components of the pump and/or its drive as well as the engine. It is to be understood, however, that the foregoing description is that of preferred embodiments of the invention. Various changes and modifications may be made without departing from the spirit and scope of the invention, as defined by the appended claims.

What is claimed is:

1. An outboard motor comprised of a power head consisting of an internal combustion engine and a surrounding protective cowling and a driveshaft housing and lower unit containing a propulsion device within said lower unit depending from said power head, said engine being mounted within said protective cowling so that its crankshaft rotates about a vertically-extending axis, said crankshaft being coupled to a drive shaft that depends into said driveshaft housing and lower unit for driving said propulsion device, said engine being formed with at least one combustion chamber, a fuel injector for injecting fuel directly into said combustion chamber, a high pressure fuel pump contained within said protective cowling and having a pumping element reciprocating along a axis for pressurizing fuel for delivery to said fuel injector, and a mechanical transmission for driving said pumping element from said crankshaft including a rotating cam that rotates about a horizontally extending axis for operating said pumping element.

2. An outboard motor as set forth in claim 1 wherein the mechanical transmission includes a flexible transmitter driven directly by the crankshaft.

3. An outboard motor as set forth in claim 2 wherein the flexible transmitter also drives another accessory.

4. An outboard motor as set forth in claim 2 wherein the engine is of the V-type having two angularly related cylinder banks each of which defines at least one combustion chamber with a valley between the cylinder banks.

5. An outboard motor as set forth in claim 4 wherein the high pressure pump is disposed at an upper end of the valley.

6. An outboard motor as set forth in claim 5 wherein the flexible transmitter also drives another accessory.

7. An outboard motor as set forth in claim 6 wherein the other accessory is also disposed at an upper end of the valley.

8. An outboard motor as set forth in claim 2 wherein the mechanical transmission also includes a pair of intermeshing gears contained in a cavity of a gear casing.

9. An outboard motor as set forth in claim 8 wherein the intermeshing gears rotate about generally perpendicular axes.

10. An outboard motor as set forth in claim 9 further including means for permitting lubricant in the gear casing to be serviced.

11. An outboard motor as set forth in claim 10 wherein the means for permitting lubricant in the gear casing to be serviced comprises at least one opening closed by a removable plug.

12. An outboard motor as set forth in claim 11 wherein there is a lower drain opening and an upper service opening each closed by a respective removable plug.

13. An outboard motor comprised of a power head consisting of an internal combustion engine and a surrounding protective cowling and a driveshaft housing and lower unit containing a propulsion device within said lower unit depending from said power head, said engine being mounted within said protective cowling so that its crankshaft rotates about a vertically-extending axis, said crankshaft being coupled to a drive shaft that depends into said driveshaft housing and lower unit for driving said propulsion device, said engine being formed with at least one combustion chamber, a fuel injector for injecting fuel directly into said combustion chamber, a high pressure fuel pump contained within said protective cowling for pressurizing fuel for delivery to said fuel injector, and a mechanical transmission for driving said pumping element from said crankshaft for delivering high pressure fuel to said fuel injector, said mechanical transmission including a gear casing having an internal cavity containing a pair of intermeshing gears and means for permitting lubricant in said gear casing to be serviced.

14. An outboard motor as set forth in claim 13 wherein the intermeshing gears rotate about generally perpendicular axes.

15. An outboard motor as set forth in claim 14 wherein the means for permitting lubricant in the gear casing to be serviced comprises at least one opening closed by a removable plug.

16. An outboard motor as set forth in claim 15 wherein there is a lower drain opening and an upper service opening each closed by a respective removable plug.

17. A system for lubricating the high pressure fuel injection pump of a two cycle, crankcase compression internal combustion engine, said engine including a cylinder block, cylinder head, crankcase assembly that defines at one side a combustion chamber in which combustion occurs and at the other side, a crankcase chamber in which a crankshaft driven by the combustion is journalled, a high pressure fuel injection pump having a mechanical drive positioned remotely from said crankcase chamber for delivering high pressure fuel to a fuel injector for said engine, a lubricating system for supplying lubricant to said crankcase chamber for lubricating components of said engine, an oil receiving well formed in a lower portion of said crankcase chamber in which drained oil can accumulate, and a conduit including a one-way check valve connecting said well with said mechanical drive for said high pressure fuel injection pump so that when the high pressure exists in said crankcase, the lubricant collected will be delivered to said pump mechanical drive for lubricating it.

18. A system for lubricating the high pressure fuel injection pump of a two cycle as set forth in claim 17 wherein the mechanical drive has a drain passage communicating with the source from which the lubricating system draws lubricant for delivery to the crankcase chamber.

19. A system for lubricating the high pressure fuel injection pump of a two cycle as set forth in claim 17 wherein the mechanical drive comprises a rotating cam.

20. A system for lubricating the high pressure fuel injection pump of a two cycle as set forth in claim 19 wherein the mechanical drive has a drain passage communicating with the source from which the lubricating system draws lubricant for delivery to the crankcase chamber.

\* \* \* \* \*